United States Patent

Ando et al.

[11] Patent Number: 6,136,255
[45] Date of Patent: Oct. 24, 2000

[54] METHOD AND DEVICE FOR MANUFACTURING BIODEGRADABLE MOLDED OBJECTS

[75] Inventors: Sadamasa Ando, Minoo; Taizo Karasawa, Ibaraki; Toshitaka Haruta, Hirakata; Akio Ozasa, Kyoto; Takayuki Kurisaka, Yawata; Tsutomu Oowada; Shinji Tanaka, both of Takatsuki, all of Japan

[73] Assignee: Nissei Kabushiki Kaisha, Osaka, Japan

[21] Appl. No.: 09/117,637

[22] PCT Filed: Dec. 12, 1997

[86] PCT No.: PCT/JP97/04575

§ 371 Date: Aug. 26, 1998

§ 102(e) Date: Aug. 26, 1998

[87] PCT Pub. No.: WO98/26914

PCT Pub. Date: Jul. 25, 1998

[30] Foreign Application Priority Data

Dec. 16, 1996 [JP] Japan ................................. 8-336092
Dec. 11, 1997 [JP] Japan ................................. 9-341149

[51] Int. Cl.[7] ............................. B29C 44/02; B29C 44/58
[52] U.S. Cl. ............................. 264/415; 249/78; 249/119; 264/53; 264/416; 264/297.1; 425/174; 425/174.6; 425/453
[58] Field of Search ............................. 264/53, 415, 416, 264/418, 297.1; 425/174, 174.6, 453; 249/78, 119

[56] References Cited

U.S. PATENT DOCUMENTS

| 2,325,637 | 8/1943 | Stewart | 264/415 |
| 4,985,189 | 1/1991 | Sugiura et al. | 264/415 |
| 5,591,491 | 1/1997 | Ando et al. | 264/450 |
| 5,965,080 | 10/1999 | Ando et al. | 264/46.4 |

FOREIGN PATENT DOCUMENTS

| 4-272833 | 9/1992 | Japan | 264/415 |
| 5-254565 | 10/1993 | Japan . | |
| 5-254855 | 10/1993 | Japan . | |
| 7-241853 | 9/1995 | Japan . | |
| 8-81565 | 3/1996 | Japan . | |

*Primary Examiner*—Allan R. Kuhns
*Attorney, Agent, or Firm*—Jordan and Hamburg LLP

[57] ABSTRACT

A voltage is applied to a feeder plate (29) from a power source section (2) including an alternating power source for dielectric heating, whereby an electric field in a direction crossing a direction in which a mold (8) is moved is applied to an incoming plate (28) which is not in contact with the feeder plate (29), so that molded object materials (9) are heated and expanded. By doing so, arc discharge caused by contact of the mold with an electrode is prevented from occurring during the heating and molding of a biodegradable molded object by dielectric heating.

37 Claims, 27 Drawing Sheets

FIG. 15
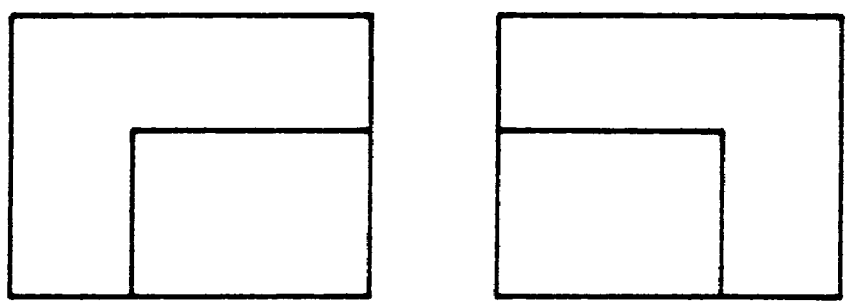
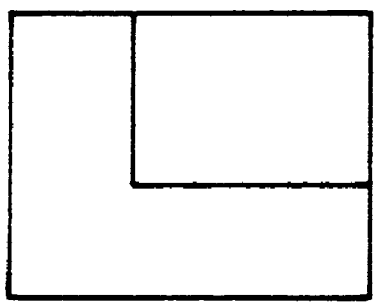

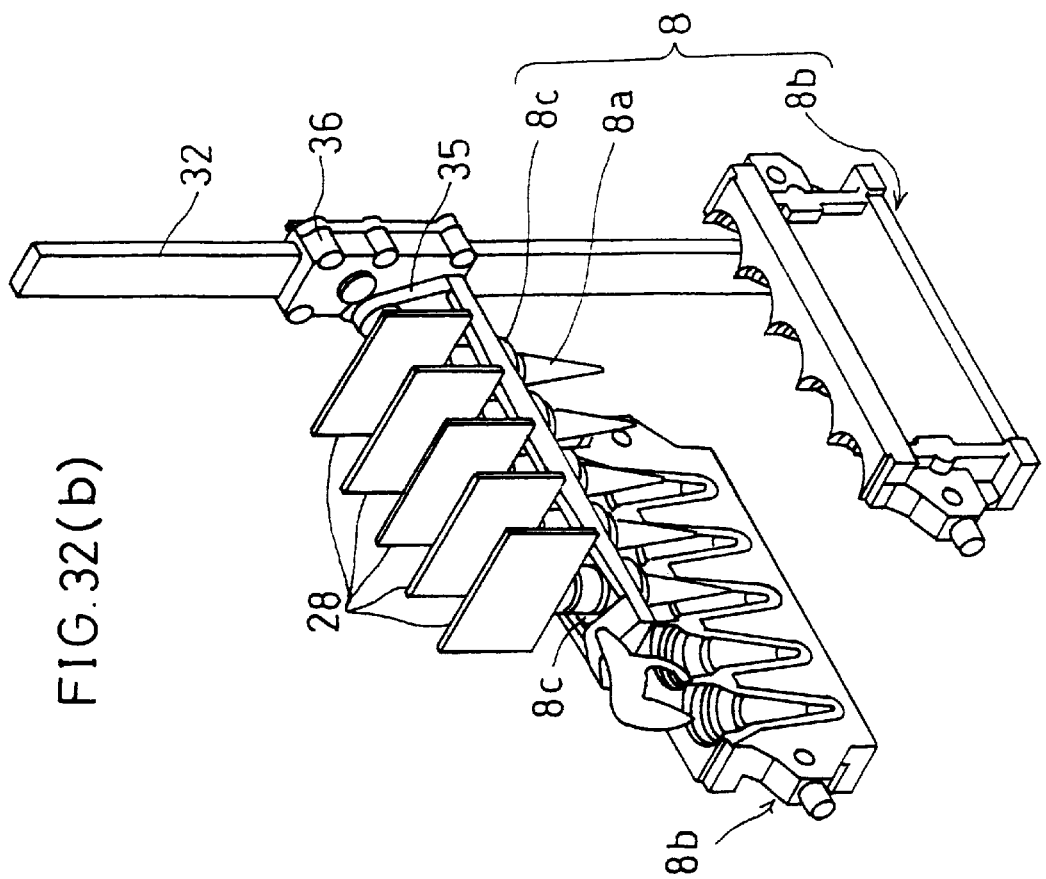
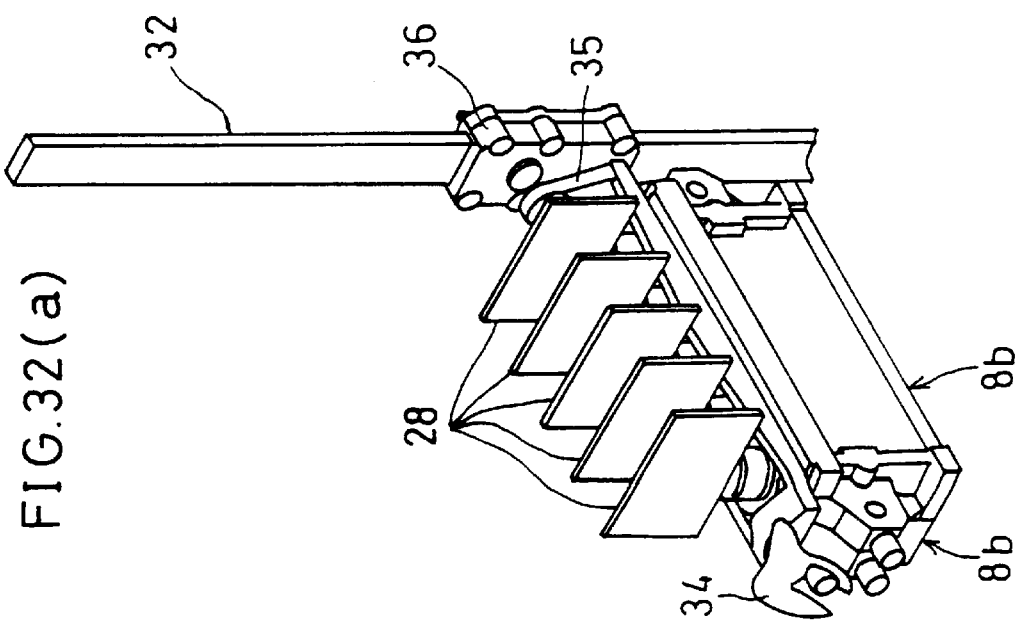

METHOD AND DEVICE FOR MANUFACTURING BIODEGRADABLE MOLDED OBJECTS

TECHNICAL FIELD

The present invention relates to a method and a device for manufacturing biodegradable molded objects made of biodegradable materials including wheat flour and starch.

BACKGROUND ART

Examples of biodegradable molded objects include containers or cushioning materials such as trays, cups, and corner pads, and molded baked snacks such as ice-cream cones, monaka, and wafers. One method for manufacturing this kind of biodegradable molded objects is the external heating method, wherein materials for the molded objects are placed into a mold previously heated to a predetermined temperature, and molding is performed using heat conductivity.

However, such a method has drawbacks in that a long molding time is required thereby leading to low productivity, and that unevenness in the temperature of the metal mold causes uneven baking, thus making it impossible to obtain a uniform consistency.

For this reason, in another method, alternating current is supplied to a metal mold so that heat is generated in the materials by dielectric heating, and with this heat, the materials are baked and molded. In this case, the metal mold is divided into two mold halves, which are insulated from each other by an insulating material provided therebetween, and alternating current is connected to each mold half, so that the materials in the mold are baked and molded by dielectric heating.

The foregoing manufacturing method by dielectric heating is, however, unsuited for mass production and is difficult to realize, since it is a method wherein power is supplied by direct contact, and moreover, the foregoing method has a drawback in that adjustment of output is complicated.

DISCLOSURE OF THE INVENTION

In order to solve the foregoing problems, a method for manufacturing biodegradable molded objects, in accordance with the present invention, is characterized by comprising the steps of (a) placing materials having biodegradability and containing flour and starch in a mold made up of first and second conductive mold halves and an insulating section therebetween, and (b) applying across both the mold halves alternating current from an alternating current power source, thus heating and expanding the materials by means of dielectric heating, wherein (i) the first mold half is provided with a conductive incoming section, (ii) a conductive feeder section is provided in parallel with the incoming section, so as to be not in contact with the incoming section, and (iii) in the step (b), the materials are heated and expanded by means of the dielectric heating, by moving the mold containing the materials in a predetermined direction, and by applying the alternating current from the alternating current power source through the feeder section and the incoming section by applying an electric field in a direction crossing the direction of the movement of the mold.

A device for manufacturing biodegradable molded objects, in accordance with the present invention, is characterized by comprising (1) a mold made up of first and second conductive mold halves and an insulating section therebetween, in which materials having biodegradability are placed, (2) an alternating current power source for applying alternating current across both the mold halves, to heat and expand the materials by means of dielectric heating, (3) a conductive incoming section provided on the first mold half, and (4) a conductive feeder section provided in parallel with the incoming section, so as to be not in contact with the incoming section, wherein, while the mold containing the materials is moved in a predetermined direction, alternating current from the power source is applied across both the mold halves through the feeder section and the incoming section, by applying an electric field in a direction crossing the direction of the movement of the mold.

Thus, the molds are not in direct contact with the electrodes. Therefore, mass production by serial operation is possible, and molded objects superior in moldability and properties can be produced.

For a fuller understanding of the nature and advantages of the invention, reference should be made to the ensuing detailed description taken in conjunction with the accompanying drawings.

BRIEF DESCRIPTION OF THE DRAWINGS

FIG. 15 is a plan view illustrating still another arrangement of a biodegradable molded object.

FIGS. 32(a) and 32(b) are views illustrating a schematic, arrangement of an metal mold and members in the vicinity of the metal mold for use in the serial molding device of FIG. 31. FIG. 32(a) is a perspective view showing a state thereof in Steps B and C shown in FIG. 31, and FIG. 32(b) is a perspective view showing a state thereof in Step D shown in FIG. 31.

BEST MODE FOR CARRYING OUT THE INVENTION

Figure 1:
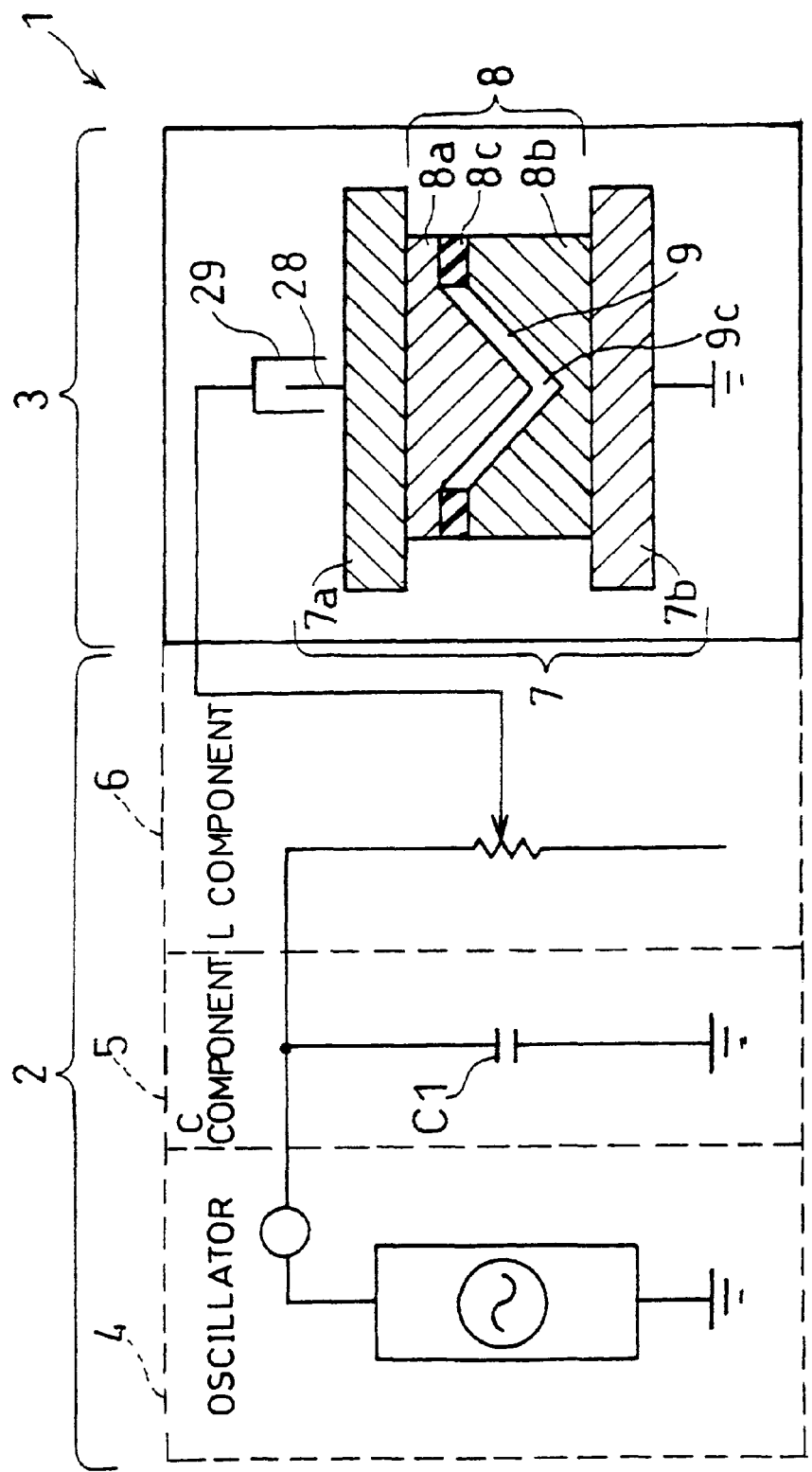
FIG. 1 is an explanatory view illustrating an arrangement of a heating device for use in manufacture of biodegradable molded objects according to the present invention.

The following description will explain examples of the present invention, while referring to FIGS. 1 through 34. First of all, structures common to all the examples are described below.

Materials

Materials for use in the present invention are shown in Tables 1 through 5 below.

TABLE 1

| MATERIAL MIXTURE NO. | 1 | 2 | 3 | 4 | 5 | 6 | 7 |
|---|---|---|---|---|---|---|---|
| POTATO STARCH | 100 | 100 | 100 | 100 | 100 | 100 | 100 |
| SALT | 0 | 0.2 | 0.5 | 1 | 2 | 5 | 0 |
| SODIUM LACTATE | 0 | 0 | 0 | 0 | 0 | 0 | 0.5 |
| DIATOMACEOUS EARTH | 1 | 1 | 1 | 1 | 1 | 1 | 1 |
| LOCUST BEAN GUM | 2 | 2 | 2 | 2 | 2 | 2 | 2 |
| STEARIC ACID | 1 | 1 | 1 | 1 | 1 | 1 | 1 |
| TOTAL SOLIDS | 104.0 | 104.2 | 104.5 | 105.0 | 106.0 | 109.0 | 104.5 |
| WATER | 100 | 100 | 100 | 110 | 110 | 110 | 100 |
| PROPORTION OF SOLIDS (%) | 50.98 | 51.03 | 51.10 | 48.84 | 49.07 | 49.77 | 51.10 |
| VISCOSITY (CP) | 3500 | 3700 | 3800 | 2700 | 2800 | 2800 | 3600 |

TABLE 2

| MATERIAL MIXTURE NO. | 8 | 9 | 10 | 11 | 12 | 13 | 14 |
|---|---|---|---|---|---|---|---|
| POTATO STARCH | 100 | 100 | 100 | 100 | 100 | 100 | 100 |
| CORN STARCH | 0 | 0 | 0 | 20 | 20 | 20 | 20 |
| CROSSLINKED POTATO STARCH | 50 | 50 | 50 | 0 | 0 | 0 | 0 |
| PULVERIZED PREVIOUSLY MOLDED OBJECTS | 0 | 0 | 0 | 3 | 3 | 3 | 3 |
| SODIUM HYDROGENCARBONATE | 0.5 | 0.5 | 0.5 | 0 | 0 | 0 | 0 |
| MICROCRYSTAL CELLULOSE | 3 | 3 | 3 | 0 | 0 | 0 | 0 |
| CALCIUM STEARATE | 0 | 0 | 0 | 0 | 0 | 0 | 2 |
| LOCUST BEAN GUM | 0 | 0 | 0 | 1 | 1 | 1 | 1 |
| XANTHENE GUM | 1.5 | 1.5 | 1.5 | 0 | 0 | 0 | 0 |

TABLE 2-continued

| MATERIAL MIXTURE NO. | 8 | 9 | 10 | 11 | 12 | 13 | 14 |
|---|---|---|---|---|---|---|---|
| PALMITIC ACID | 0 | 0 | 0 | 0 | 1 | 10 | 0 |
| SOYBEAN OIL | 1 | 1 | 1 | 2 | 0 | 0 | 0 |
| LECITHIN | 0.1 | 0.1 | 0.1 | 0.2 | 0 | 0 | 0 |
| FATTY ACID ESTER | 0 | 0 | 0 | 0 | 0.1 | 1 | 0 |
| TOTAL SOLIDS | 156.1 | 156.1 | 156.1 | 126.2 | 125.1 | 135.0 | 126.0 |
| WATER | 60 | 150 | 240 | 130 | 130 | 140 | 130 |
| PROPORTION OF SOLIDS (%) | 72.24 | 51.00 | 39.41 | 49.26 | 49.04 | 49.09 | 49.22 |
| VISCOSITY (CP) | DOUGH | 4000 | 600 | 2500 | 2500 | 2000 | 2500 |

TABLE 3

| MATERIAL MIXTURE NO. | 15 | 16 | 17 | 18 | 19 | 20 | 21 |
|---|---|---|---|---|---|---|---|
| POTATO STARCH | 100 | 100 | 100 | 100 | 100 | 100 | 100 |
| TAPIOCA STARCH | 0 | 0 | 0 | 0 | 100 | 100 | 100 |
| PRE-GELATINIZED POTATO STARCH | 3 | 3 | 3 | 0 | 0 | 0 | 0 |
| PRE-GELATINIZED TAPIOCA STARCH | 0 | 0 | 0 | 0 | 2 | 2 | 5 |
| CROSSLINKED POTATO STARCH | 20 | 50 | 100 | 0 | 0 | 0 | 0 |
| PULVERIZED PREVIOUSLY MOLDED OBJECTS | 0 | 0 | 0 | 3 | 0 | 0 | 0 |
| CALCIUM STEARATE | 2 | 2 | 2 | 2 | 2 | 2 | 2 |
| SORBITOL | 5 | 5 | 5 | 5 | 5 | 5 | 5 |
| XANTHENE GUM | 0.8 | 0.8 | 0.8 | 0.8 | 0.8 | 0 | 0.4 |
| TOTAL SOLIDS | 130.8 | 160.8 | 210.8 | 110.8 | 109.8 | 109.0 | 112.4 |
| WATER | 130 | 160 | 210 | 110 | 110 | 110 | 110 |
| PROPORTION OF SOLIDS (%) | 50.15 | 50.12 | 50.10 | 50.18 | 49.95 | 49.77 | 50.54 |
| VISCOSITY (CP) | 4200 | 4500 | 5200 | 5000 | 4200 | 2800 | 5500 |

TABLE 4

| MATERIAL MIXTURE NO. | 22 | 23 | 24 | 25 | 26 | 27 | 28 |
|---|---|---|---|---|---|---|---|
| FLOUR | 100 | 100 | 100 | 100 | 100 | 100 | 100 |
| STARCH | 20 | 20 | 20 | 20 | 20 | 20 | 20 |
| SALT | 0 | 0.2 | 0.5 | 1 | 2 | 5 | 10 |
| SUGAR | 5 | 5 | 5 | 5 | 5 | 5 | 5 |
| FLAVORING | 0 | 0 | 0 | 0 | 0 | 0 | 0 |
| LEAVENING | 0.5 | 0.5 | 0.5 | 0.5 | 0.5 | 0.5 | 0.5 |
| COLORANT | 1 | 1 | 1 | 1 | 1 | 1 | 1 |
| AROMATIC | 1 | 1 | 1 | 1 | 1 | 1 | 1 |
| OIL/EMULSIFIER | 2 | 2 | 2 | 2 | 2 | 2 | 2 |
| TOTAL SOLIDS | 129.5 | 129.7 | 130.0 | 130.5 | 131.5 | 134.5 | 139.5 |
| WATER | 130 | 130 | 130 | 130 | 130 | 130 | 140 |
| PROPORTION OF SOLIDS (%) | 49.90 | 49.94 | 50.00 | 50.10 | 50.29 | 50.85 | 49.91 |
| VISCOSITY (CP) | 2700 | 2600 | 3000 | 2700 | 2800 | 2800 | 2500 |

TABLE 5

| INGREDIENT MIXTURE NO. | 29 | 30 | 31 | 32 | 33 | 34 | 35 | 36 |
|---|---|---|---|---|---|---|---|---|
| FLOUR | 100 | 100 | 100 | 100 | 100 | 100 | 100 | 100 |
| STARCH | 20 | 20 | 20 | 10 | 150 | 20 | 20 | 20 |
| PULVERIZED PREVIOUSLY MOLDED OBJECTS | 0 | 0 | 0 | 0 | 0 | 20 | 0 | 0 |
| SALT | 0.5 | 0.5 | 0.5 | 0.5 | 0.5 | 0.5 | 0.5 | 0.5 |
| SUGAR | 5 | 5 | 5 | 5 | 5 | 5 | 2 | 60 |
| FLAVORING | 5 | 5 | 5 | 0 | 0 | 0 | 5 | 5 |

TABLE 5-continued

| INGREDIENT MIXTURE NO. | 29 | 30 | 31 | 32 | 33 | 34 | 35 | 36 |
|---|---|---|---|---|---|---|---|---|
| LEAVENING | 0.5 | 0.5 | 0.5 | 0.5 | 0.5 | 0.5 | 0.5 | 0.5 |
| COLORANT | 1 | 1 | 1 | 1 | 1 | 1 | 1 | 1 |
| AROMATIC | 1 | 1 | 1 | 1 | 1 | 1 | 1 | 1 |
| OIL/EMULSIFIER | 2 | 2 | 2 | 2 | 2 | 2 | 2 | 2 |
| TOTAL SOLIDS | 135 | 135 | 135 | 120 | 265 | 150 | 132 | 190 |
| WATER | 70 | 40 | 230 | 120 | 260 | 150 | 130 | 190 |
| PROPORTION OF SOLIDS (%) | 65.85 | 49.09 | 36.99 | 50.00 | 50.00 | 50.00 | 50.38 | 50.00 |
| VISCOSITY (CP) | DOUGH | 2500 | 300 | 2700 | 2800 | 6500 | 3500 | 3300 |

As shown in tables 1 and 4, by varying the quantity of salt added, the conductivity of the materials changes, and this influences molding by internal heating. By changing the quantity and type of salt, conductivity can be controlled.

In all cases of the mixtures and the shapes, biodegradable molded objects superior in moldability and physical properties were obtained by molding by internal heating.

As discussed above, the mixtures No. 1 through No. 36 set forth in Tables 1 through 5 are used for materials in the present invention.

Devices

Next, the devices used in the present invention will be explained. The molded objects were prepared by placing the foregoing materials in a mold to be discussed below, and then heating and expanding in a heating device. For the heating device, an electromagnetic wave heating device HC (hereinafter referred to as device HC) is used. FIGS. 1 through 4 illustrate schematic arrangements of an electromagnetic wave heating device. Note that a frequency used is in a range of 1 MHz to 100 MHz.

The device HC includes three types: HC1, HC2, and HC3.

The power source for the device HC is an industrial power source with a voltage of 200V and a frequency of 60 Hz.

The oscillator of the device HC is a device which oscillates at a specified frequency only. Using oscillators, device HC1 uses a frequency of 5.0 MHz, HC2 a frequency of 13.56 MHz, and HC3 a frequency of 40.68 MHz.

The electrodes of the device HC are devices for supplying high-frequency current to the materials through the mold.

In this device HC, temperature adjustment refers to adjustment of the temperature of the metal mold, prior to molding, using an electric heater installed in the metal mold, or directly heating the metal mold externally using a gas burner, or using IH (induction heating) to heat the metal mold, etc. Without this kind of temperature adjustment, the temperature of the metal mold is within a range up to 100° C.

The following will explain the structure of the foregoing electromagnetic wave heating device.

As shown in FIG. 1, an electromagnetic wave heating device 1 includes a power section 2 and a heating section 3 (electrode section). Further, although not shown in the drawing, the heating section 3 includes a vacuum pump, a lock section which fixes upper and lower mold halves and an external heating section.

The power section 2 uses for a power source an oscillator 4 of the vacuum tube type. Energy efficiency is determined by the output of the oscillator 4. Mold halves 8a and 8b (to be discussed below) constituting a metal mold 8 must not come into direct contact with one another, and thus an insulating section is provided therebetween. An insulating body 8c is used for the insulating section. The insulating section is for preventing the mold 8a and 8b from touching one another, and may be provided as a space. In addition, a ground and an electromagnetic wave shield should be provided to each of the required devices.

Further, as a regulating circuit, a variable capacitor (referred to as "C component") 5 and a variable coil (referred to as "L component") 6 are provided. By changing the C component 5 and the L component 6 according to the object to be heated, optimum output and tuning can be obtained. As the C component 5, a manual capacitor C1 (referred to as the "C1 component") is provided.

Figure 2:
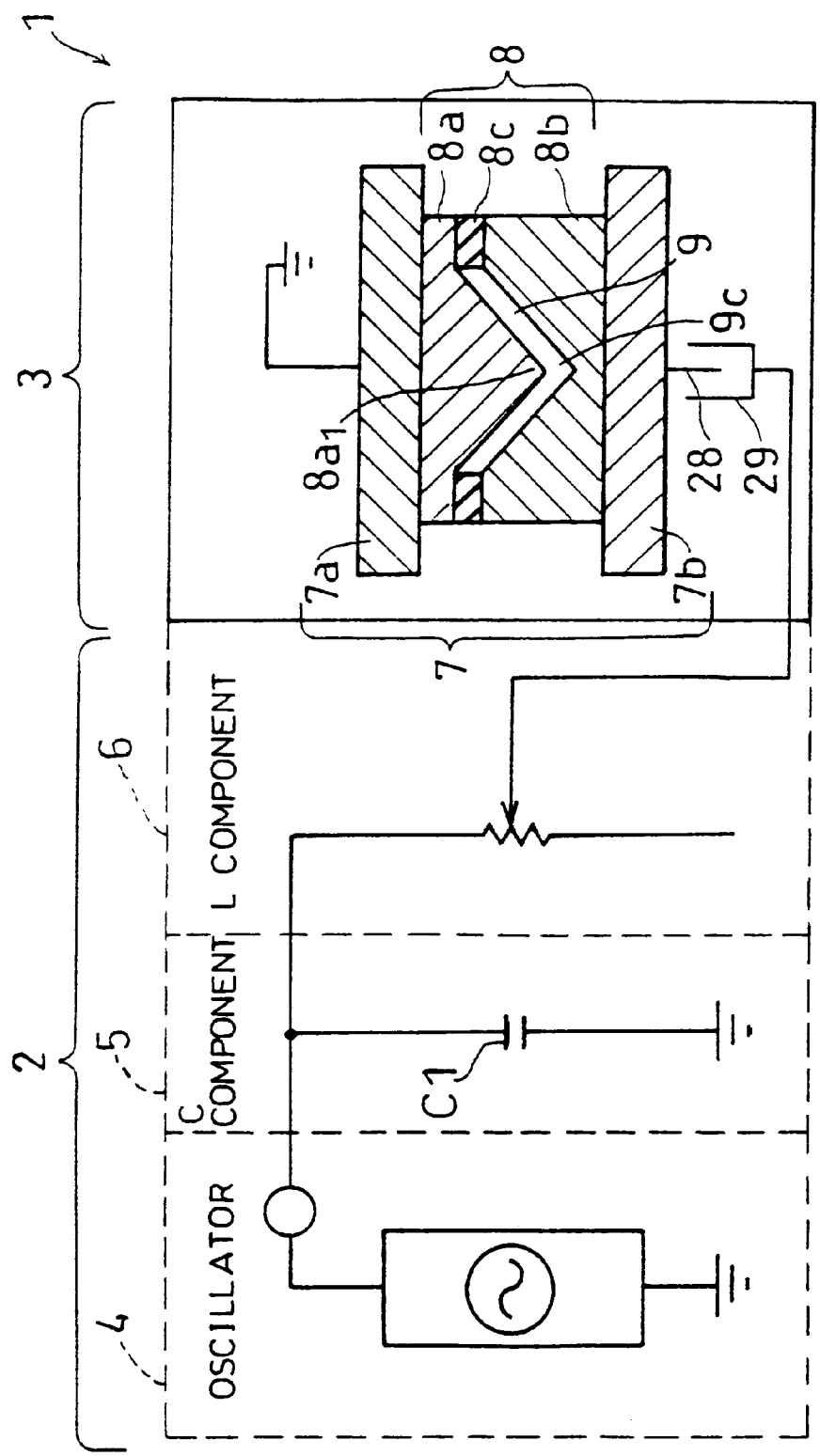
FIG. 2 is an explanatory view illustrating another arrangement of a heating device for use in manufacture of biodegradable molded objects according to the present invention.

In the device shown in FIG. 2, the mold half 8a (in FIG. 2, the upper side), having more pointed areas such as the apex $8a_1$ than the other mold half 8b, is grounded. When the mold half 8a has more pointed areas of this kind than the mold half 8b, if, as shown in FIG. 1, the mold half 8a is connected to the power source and the other mold half 8b is grounded, energy from the power source tends to concentrate in the pointed area, and thus localized heating of an apex area 9c of the materials 9 is likely to occur. For this reason, by grounding the mold half 8a having a pointed area, as shown in FIG. 2, energy from the power source can be prevented from concentrating in the pointed area, and it is easier to prevent localized heating than with the device shown in FIG. 1.

Figure 3:
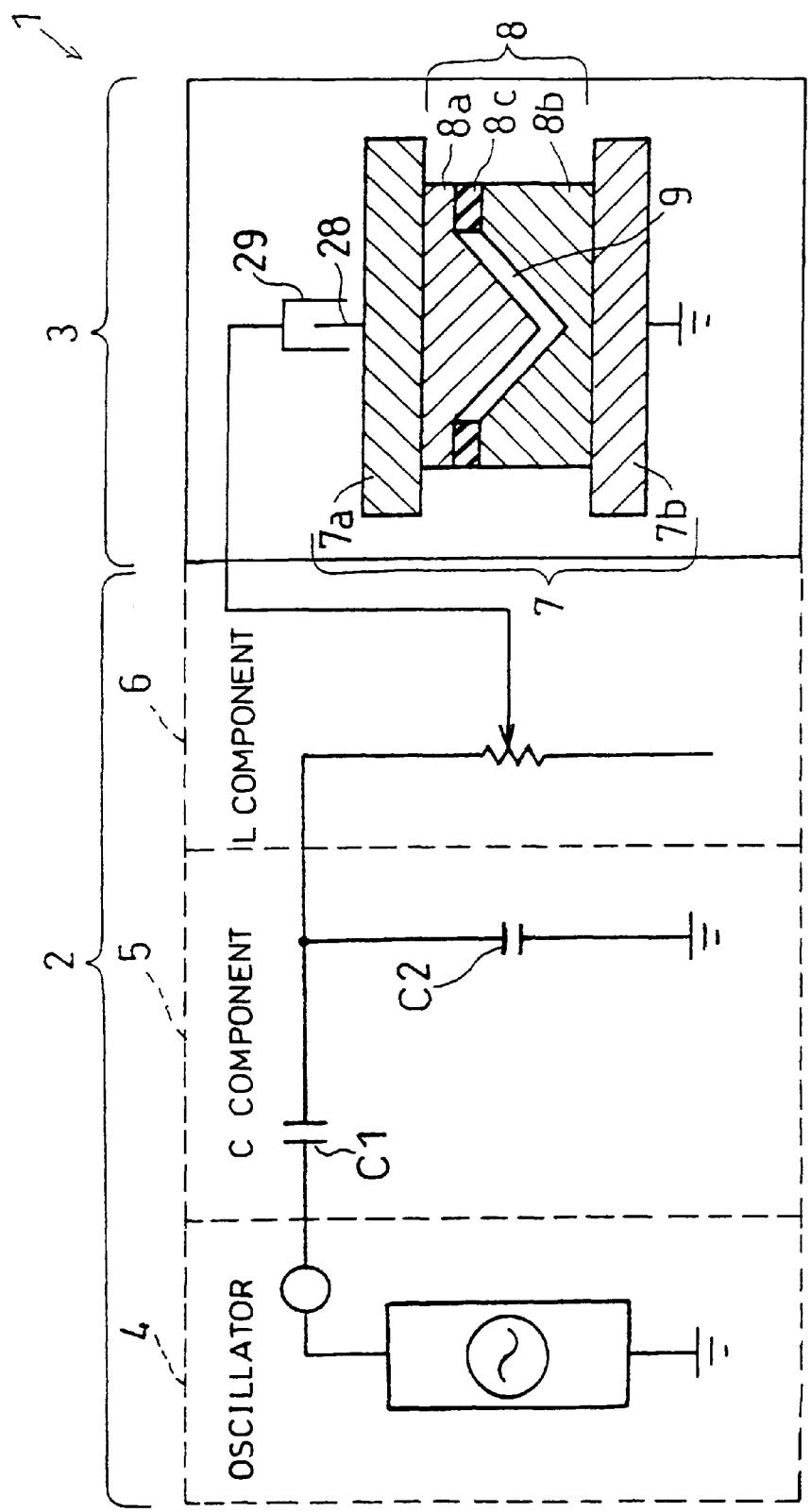
FIG. 3 is an explanatory view illustrating still another arrangement of a heating device for use in manufacture of biodegradable molded objects according to the present invention.

By providing, as shown in FIG. 3, an automatic capacitor C2 (referred to as the "C2 component") as a variable capacitor for automatic regulation and tuning, anode current from the oscillator vacuum tube can be controlled to a constant value. This anode current is controlled by an automatic tracking circuit. The automatic tracking circuit is a circuit which can automatically change an interval between the plates of an air capacitor using a motor, and which maintains a constant anode amperage in accordance with changes in the dielectric constant across the two electrodes of the heating section 3.

Figure 18:
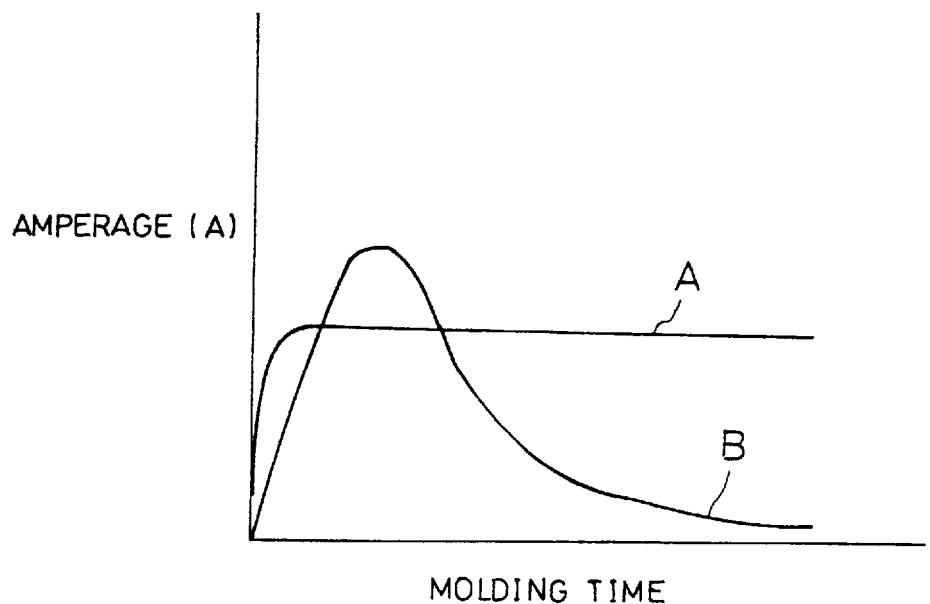
FIG. 18 is a graph illustrating how anode current of an oscillator varies during a heating treatment.

When the automatic capacitor C2 is in operation, the transition in the anode amperage of the oscillator is as shown at curve A in FIG. 18. In other words, the amperage can be supplied in a constant quantity. The automatic function of the automatic capacitor C2 can be turned off, and the amperage set manually. When the automatic function is turned off, the transition is as shown at curve B in FIG. 18. In other words, the amperage changes according to the dielectric properties of the object to be molded.

As shown in FIGS. 1 and 2, one of the two electrodes 7a and 7b is a feed electrode, and the other a grounding electrode. In the arrangement shown in FIG. 1, the electrode 7a is the feed electrode, and electrode 7b the grounding electrode. In FIG. 2, the electrodes are connected in the opposite manner.

Although not shown in the drawing, the heating section 3 is provided with an electric heater and a temperature regulator (temperature regulating unit), and thus the metal mold 8 can be heated at a predetermined temperature. Incidentally, when using external heating alone, current is not supplied from the power section 2, and heating and molding are performed by this heater alone.

The entirety of the heating section 3 is a vacuum chamber, and, using the aforementioned vacuum pump, the air pressure therein can be reduced.

Figure 4:
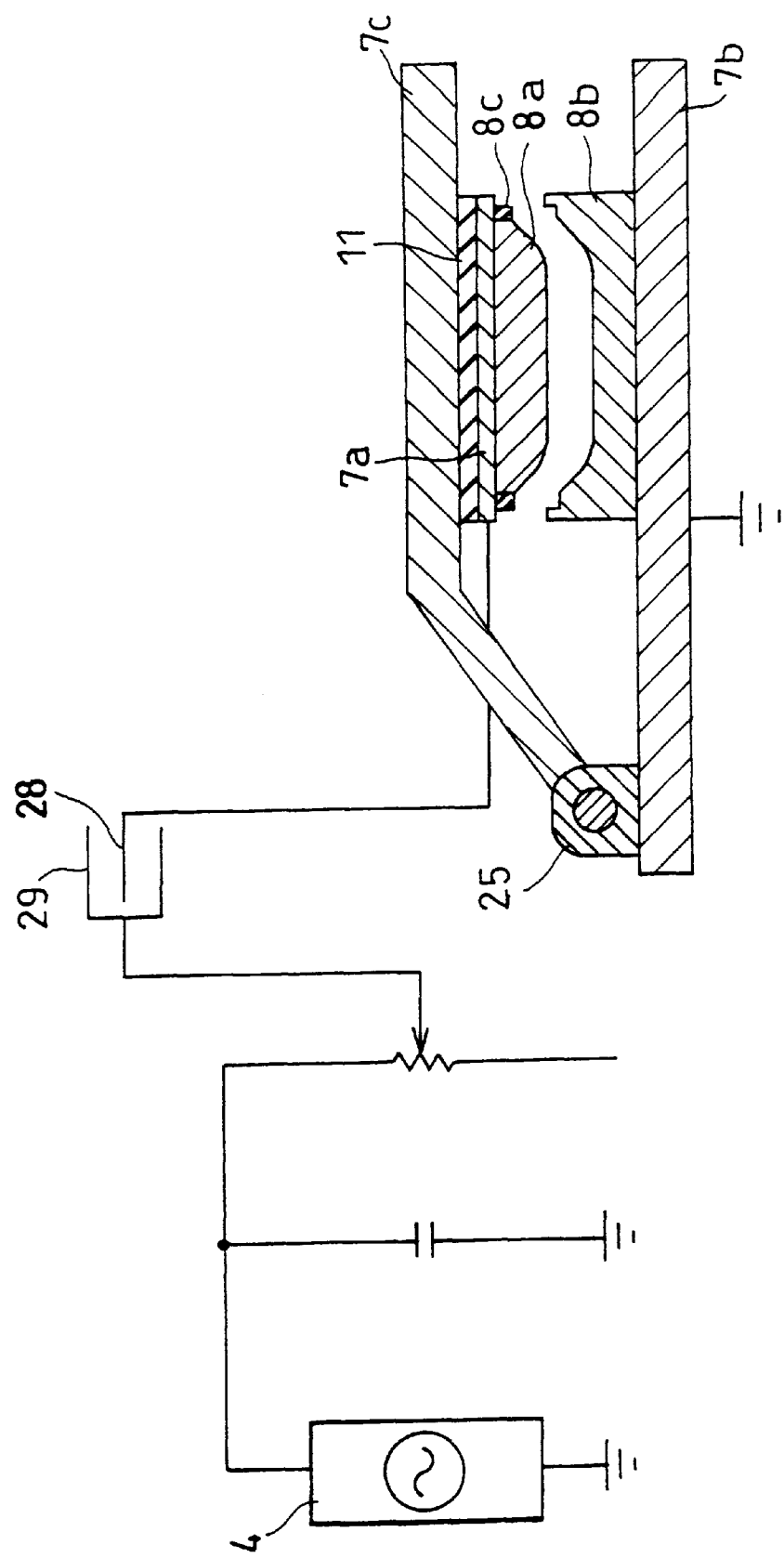
FIG. 4 is an explanatory view illustrating still another arrangement of a heating device for use in manufacture of biodegradable molded objects according to the present invention.

A device shown in FIG. 4 is arranged so that the oscillator 4 is directly connected with the electrode 7a, and power is supplied to the mold half 8b through the mold half 8a which is fixed to the electrode 7a. An upper cover 7c and the electrode 7b are arranged so as to be opened/closed, with a hinge 25 provided therebetween. If the upper cover 7c serves as the electrode 7a, upon power supply, conductivity of the hinge 25 makes power supply to the mold 8a and 8b impossible. In the device shown in FIG. 4, however, an insulating material 11 is provided between the upper cover 7c and the electrode 7a, causing the hinge 25, the upper cover 7c, and the electrode 7b to be all grounded. Therefore, when the mold 8a and 8b are fixed, no conducting occurs, thereby ensuring that the fixing is performed in safety.

Figure 5:
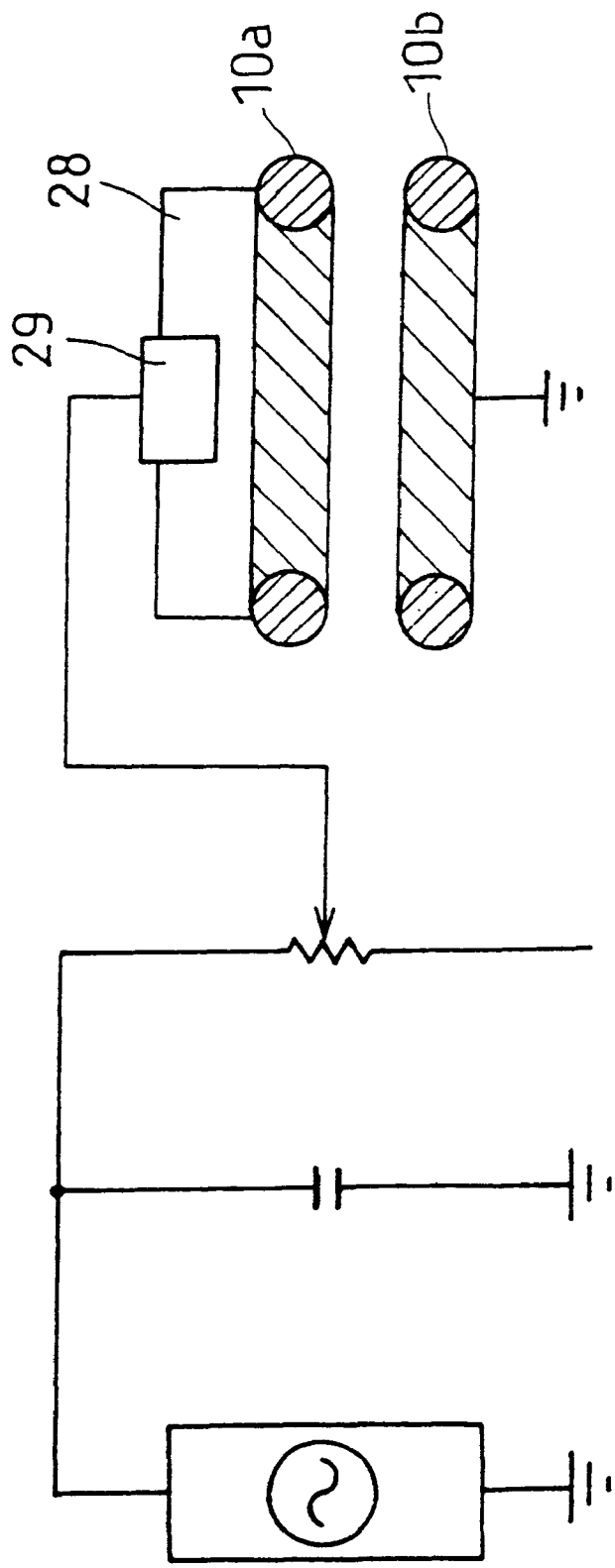
FIG. 5 is an explanatory view illustrating still another arrangement of a heating device for use in manufacture of biodegradable molded objects according to the present invention.

In the case where an object to be heated is sequentially placed and removed to and from between the electrodes 7a and 7b while the oscillator 4 continuously outputs, arc discharge occurs when the object to be heated directly contacts the electrodes 7a and 7b, thereby causing the operation to fail. Then, in the case where the structure on the feed side is made to be a non-contact structure as shown in FIGS. 1 through 4, this prevents arc discharge from occurring, thereby enabling continuous operation. In the case where an object in a sheet form is continuously formed, the operation can be performed easily if electrodes 10a and 10b each in a belt form, as shown in FIG. 5, are used.

More specifically, to form a non-contact structure on the feed side as shown in FIGS. 1 through 4, an incoming plate (incoming section) 28 is installed on the electrode 7a connected with the oscillator 4, while a feeder plate (feeder section) 29 is installed on the other electrode 7b connected with the oscillator 4.

Figure 6A:
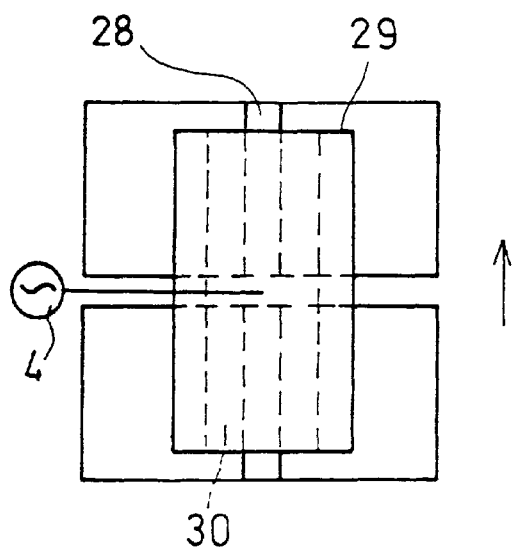
FIGS. 6(a) through 6(c) are a plan view, a cross-sectional view, and a side view, respectively, showing an arrangement of an incoming plate and a feeder plate.
Figure 6B:
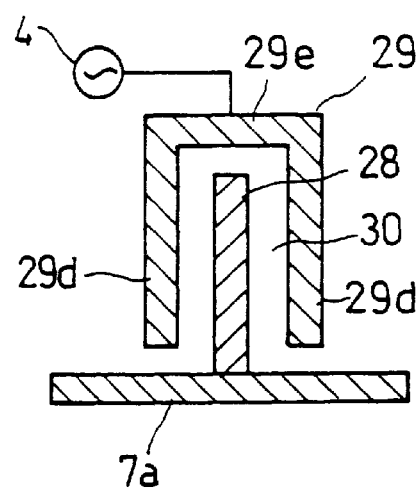
Figure 6C:
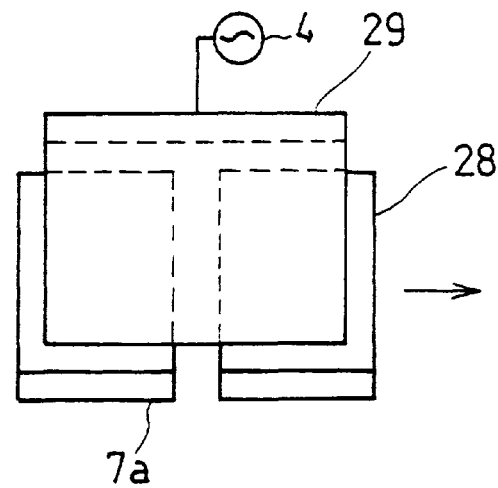

The incoming plate 28 and the feeder plate 29 may be formed, for example, in a structure shown in FIGS. 6(a) through 6(c). The incoming plate 28 is a conductive plate-form member made of a metal or the like. The feeder plate 29 is formed by bending a rectangular conductive plate-form member made of a metal or the like along two lines parallel with a lengthwise direction thereof so as to have a U-shape cross section. More specifically, the feeder plate 29 is composed of side portions 29d on each side and a top portion 29e which connects the side portion 29d. The incoming plate 28 is disposed between the side portion 29d, with a space 30 therebetween, so that they are not in contact with each other.

During a heating treatment, the electrodes 7a and 7b (see FIG. 1) and the object to be heated are transported by a transport belt conveyer (not shown) in the aforementioned lengthwise direction (a depth direction in FIG. 1, an arrow direction in FIGS. 6(a) and 6(c)), with the incoming plate 28 and the feeder plate 29 kept in non-contact with each other, and the object to be heated is heated while being thus moved.

The non-contact structure on the feeder section may be arranged as shown in FIGS. 7 through 11(b). In the case where a structure of this kind is used on the feeder section, the manner of application of the electric energy to the metal mold 8 can be varied with position of the feeder section by modifying the structure, as described below. Arrows in the figures indicate a travelling direction of the incoming plate 28.

Figure 7:
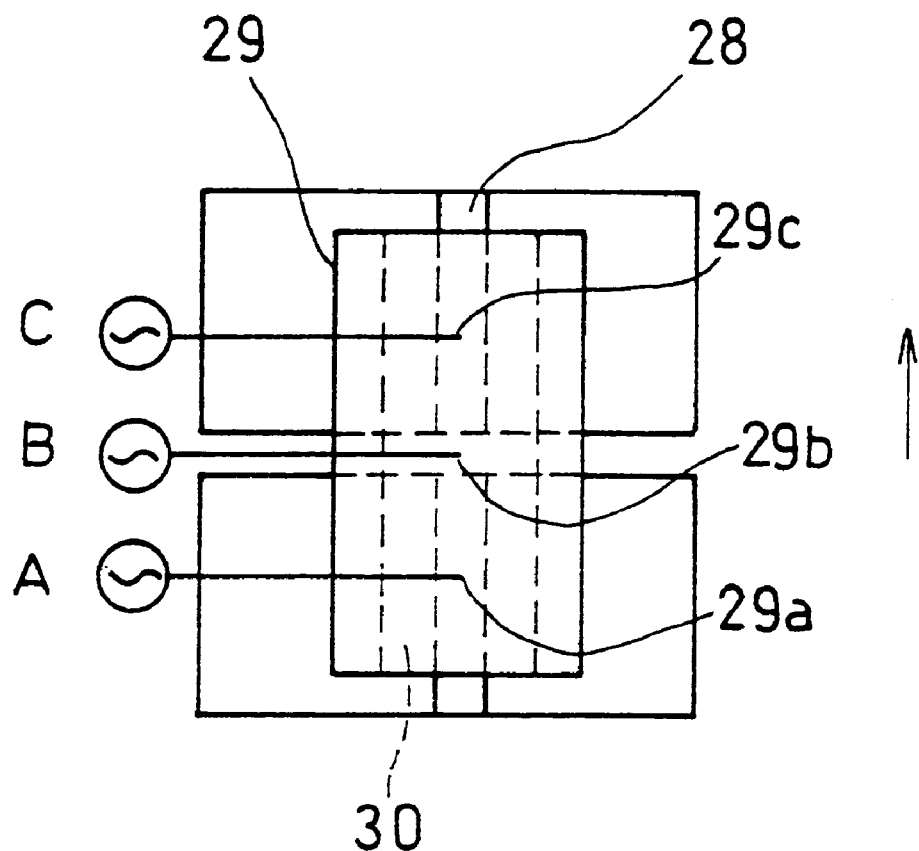
FIG. 7 is a plan view illustrating another arrangement of the incoming plate and the feeder plate.

For example, assume that, as shown in FIG. 7, the object to be heated is heated and dried while the incoming plate 28, kept in non-contact with the feeder plate 29, is moved from a bottom side to an upper side in the figures. When the incoming plate 28 enters the space 30 of the feeder plate 29, the incoming plate 28 and the feeder plate 29 function as a capacitor thereby starting power supply, and thus, a heating and drying operation starts. While the incoming plate 28 and the feeder plate 29 overlap each other, the heating and drying operation continues. When the incoming plate 28 comes out of the space 30 of the feeder plate 29, the power supply stops, whereby the heating and drying operation ends.

Here, a feed position to the feeder plate 29 is changed, as shown by A through C of FIG. 7. For example, in the case where the feed position is shifted toward an end of the feeder plate 29, the potential is biased. In this case, a potential difference from the potential of the grounded electrode is greater at the feed position than that at any other portion of the feeder plate 29, and an output from the portion at the feed position is greater than that from the other portions. On the other hand, in the case where the feed position is shifted to the center of the feeder plate 29, the feeder plate 29 has a uniform potential in a balanced manner, and a uniform output is obtained throughout the feeder plate 29.

Assume that a line through which the oscillator 4 is connected with the electrode 7a is connected with the feeder plate 29 at a position 29a which is closer to a side (in FIG. 7, the bottom side) of entry of the incoming plate 28, as shown in A of FIG. 7. In this case, since a distance between the feeder plate 29 and a portion of the incoming plate 28 to which power is fed is short at an initial stage of the heating and drying operation, supplied power is great at the initial stage of the heating and drying operation.

Assume that the line is, as shown by B in FIG. 7, connected with the feeder plate 29 at a position 29b which is in the vicinity of center of the feeder plate 29. In this case, since a distance between the feeder plate 29 and a portion of the incoming plate 28 to which power is fed becomes short at a middle stage of the heating and drying operation, supplied power becomes great at the middle stage of the heating and drying operation. Therefore, the output becomes totally even.

Furthermore, assume that the line is, as shown by C in FIG. 7, connected with the feeder plate 29 at a position 29c which is closer to a side (in FIG. 7, the upper side) of outgoing of the incoming plate 28. In this case, since a distance between the feeder plate 29 and a portion of the incoming plate 28 to which power is fed becomes short at a latter stage of the heating and drying operation, supplied power becomes great at the latter stage of the heating and drying operation.

Figure 8:
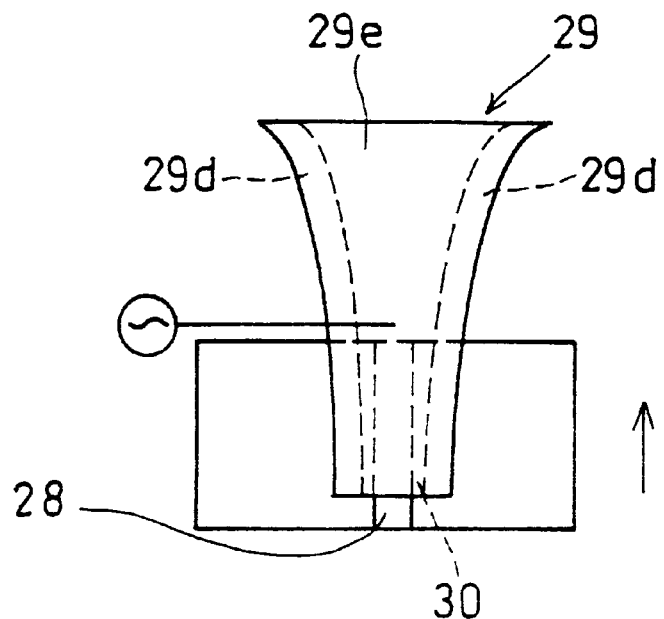
FIG. 8 is a plan view illustrating still another arrangement of the incoming plate and the feeder plate.

In addition, for example as shown in FIG. 8, the feeder plate 29 may be formed so as to have such a U-shape cross section that the side portion 29d becomes more distant from one another thereby causing the distance therebetween to increase in the travelling direction of the incoming plate 28 (in FIG. 8, upward). By doing so, as the incoming plate 28 moves during the heating and drying operation, the distance between the incoming plate 28 and the side portion 29d increases, thereby causing supplied power to gradually decrease. Therefore, the output is greater at the initial stage of the operation, while the output is smaller at the latter stage of the operation.

Figure 9:
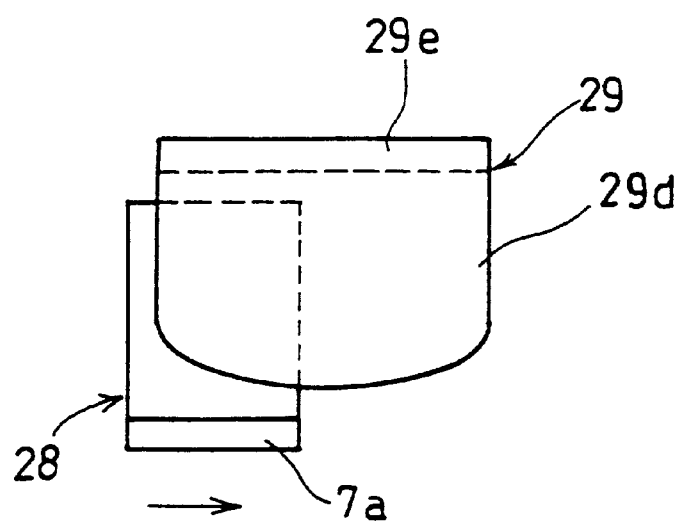
FIG. 9 is a plan view illustrating still another arrangement of the incoming plate and the feeder plate.

Furthermore, as shown in FIG. 9 for example, the feeder plate 29 may be formed so that each edge of the side portions 29d is shaped in an arc. By doing so, an area of the incoming plate 28 overlapped by the feeder plate 29 smaller at the initial and latter stages of the heating and drying operation, while greater at the middle stage. Therefore, supplied power is smaller at the initial and latter stages, while greater at the middle stage.

Figure 10:
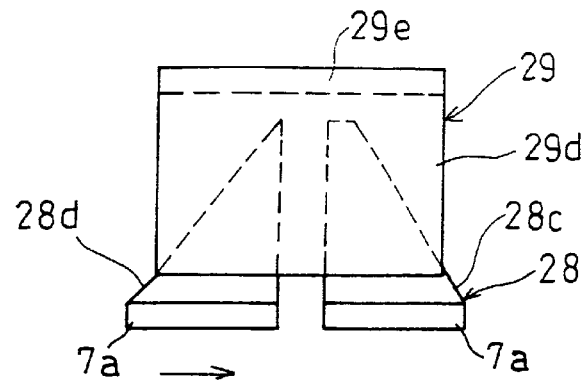
FIG. 10 is a plan view illustrating still another arrangement of the incoming plate and the feeder plate.

Furthermore, as shown in FIG. 10 for example, the incoming plate 28 may be cut out to a triangular shape. More specifically, the incoming plate 28 may have a cutout 28c so as to have the hypotenuse in the front part in the travelling direction, or may have a cutout 28d so as to have the hypotenuse in the rear part in the travelling direction. In the case where the incoming plate 28 has the cutout 28c, an area of the incoming plate 28 overlapped by the feeder plate 29 is smaller at the initial stage of the heating and drying operation, and becomes greater at the latter stage. Therefore, in this case, supplied power is smaller at the initial stage and becomes greater at the latter stage. In the case where the incoming plate 28 has the cutout 28d, an area of the incoming plate 28 overlapped by the feeder plate 29 is greater at the initial stage of the heating and drying operation, and becomes smaller at the latter stage. Therefore, in this case, supplied power is greater at the initial stage and becomes smaller at the latter stage.

Thus, the shapes of the incoming plate 28 and the feeder plate 29 can be appropriately changed, so as to match materials and shapes of objects to be molded. By doing so, a desired molded object can be easily produced.

Figure 11A:
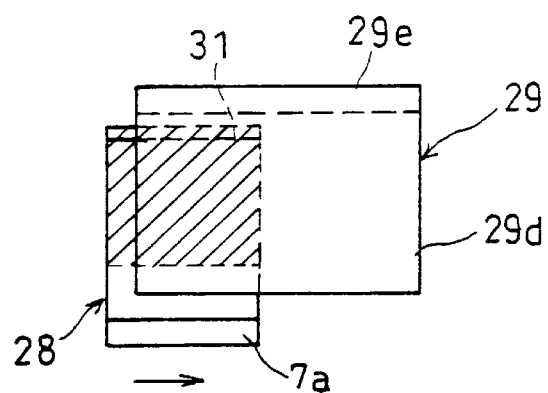
FIGS. 11(a) and 11(b) are a plan view and a cross-sectional view, respectively, illustrating still another arrangement of the incoming plate and the feeder plate.
Figure 11B:
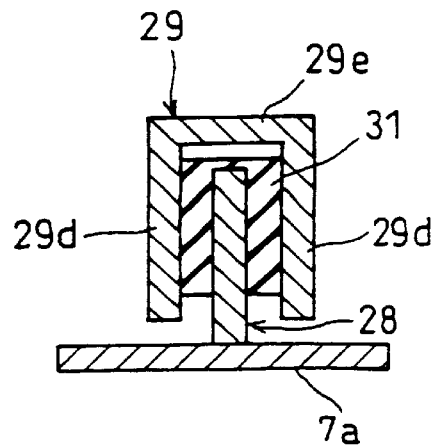

Furthermore, by providing an insulating body 31, as shown in FIGS. 11(a) and 11(b), in the entirety of the space 30 between the incoming plate 28 and the feeder plate 29, the heating and drying operation is made more efficient. By providing the insulating body 31 in the space 30, the incoming plate 28 and the feeder plate 29 are made to move in non-contact with each other, with a constant distance therebetween at all times, whereby stable heating and drying is enabled.

Figure 12A:
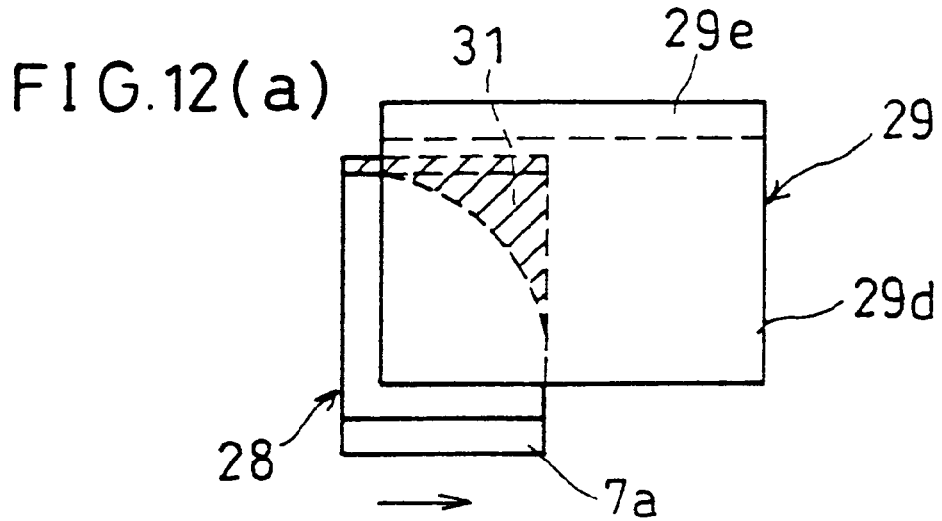
FIGS. 12(a) and 12(b) are a plan view and a cross-sectional view, respectively, illustrating still another arrangement of the incoming plate and the feeder plate.
Figure 12B:
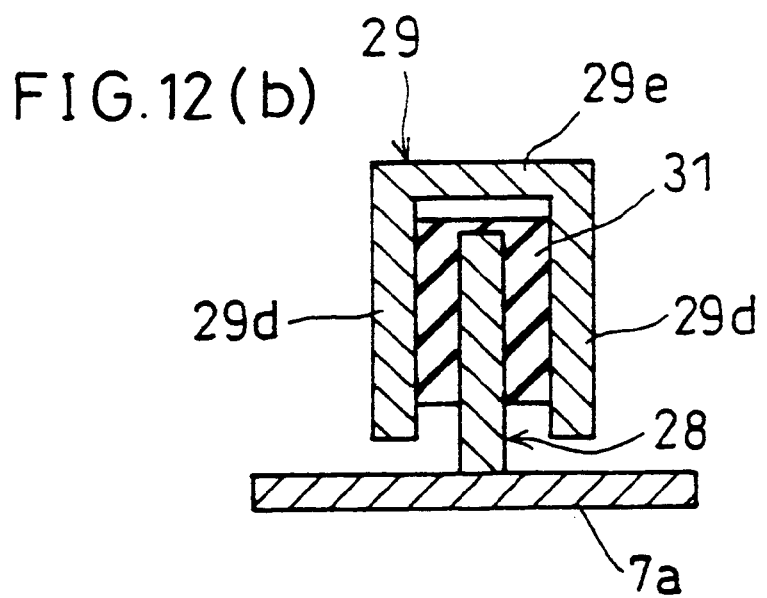

Furthermore, as shown in FIGS. 12(a) and 12(b), the insulating body 31 may be provided in the space 30 between the incoming plate 28 and the feeder plate 29 in a different manner from that shown in FIGS. 11(a) and 11(b). The insulating body 31 may be provided at different positions on the incoming plate 28, for example, as shown in FIG. 12(a). By doing so, electric energy applied to the metal mold 8 can be adjusted with a simple structure. The electric energy may also be adjusted by changing a position at which the insulating body is provided, or by changing combination of materials with different dielectric properties which are used for forming the insulating body 31.

In short, since problems such as sparking tend to occur at the initial and end stages of heating, the initial and end stages are particularly focused in the examples shown in FIGS. 9, 10, 12(a) and 12(b), and supplied power is greatly changed at these stages in these examples.

Mold

The following will explain the structure of the metal mold 8, which serves as the mold into which the materials are placed.

The metal mold 8 is basically divided into two blocks. Although not shown in the drawings, depending on the shape of the molded object and the method of removal, a metal mold made up of three or more parts, such as a split mold or one provided with a knockout pin, may be used, but even in these cases, the parts are grouped into two blocks, i.e., a feeder side and a grounded side.

Vapor release sections are provided in the metal mold in order to adjust an inner pressure. It is satisfactory if the vapor is released to the exterior in a balanced manner, and thus, there is no particular limitation on the shape, size, and number of the vapor release sections.

Molded Objects

The following will explain the molded objects prepared using the foregoing materials, mold, and heating devices.

Samples shown in Table 6 and in FIGS. 13(a) through 17(b) were baked. In each case, a mold appropriate to the desired shape was used. Incidentally, although not discussed in the present embodiment, in the case of plate- or sheet-shaped cushioning material, a continuous roller method like that shown in FIG. 5 may be used, or this method may be used for post-processing of sheets.

TABLE 6

| OBJECT SHAPE | OBJECT NAME | SURFACE AREA (cm$^2$) | PROJECTED AREA (cm$^2$) | AVERAGE THICKNESS (mm) | MOLDED WEIGHT (g) | MOLDING EXTERNAL HEATING | MOLDING INTERNAL HEATING |
|---|---|---|---|---|---|---|---|
| (1) | L TRAY | 532 | 484 | 3.5 | 28 ± 2.0 | ○ | ◎ |
| (2) | L TRAY (WITH DIVIDERS) | 581 | 484 | 3.5 | 32 ± 2.0 | ○ | ◎ |
| (3) | CORNER PAD | 188 | 100 | 50 | 50 ± 3.0 | X | ◎ |
| (4) | CAKE CONE | 100 | 20 | 2 | 4.0 ± 0.2 | ○ | ◎ |
| (5) | RICE CRACKER | 125 | 125 | 2.5 | 15.0 ± 1.0 | ○ | ◎ |

Figure 13A:
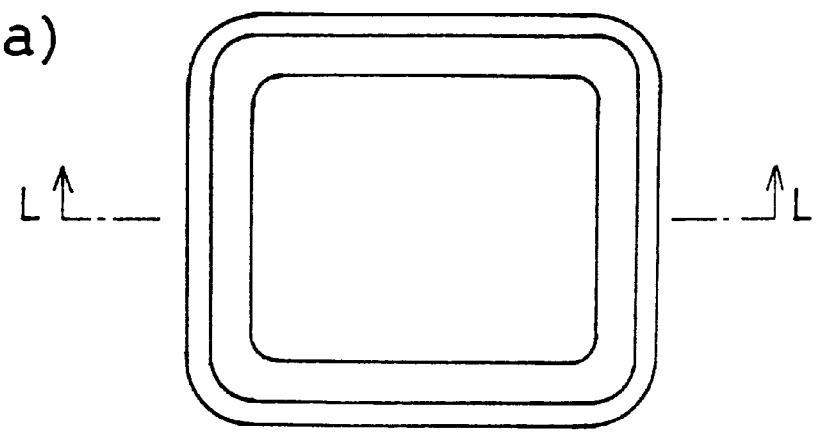
FIG. 13(a) is a plan view illustrating an arrangement of a biodegradable molded objects.
Figure 13B:
FIG. 13(b) is a cross-sectional view along an L—L arrow line of FIG. 13(a).
Figure 14A:
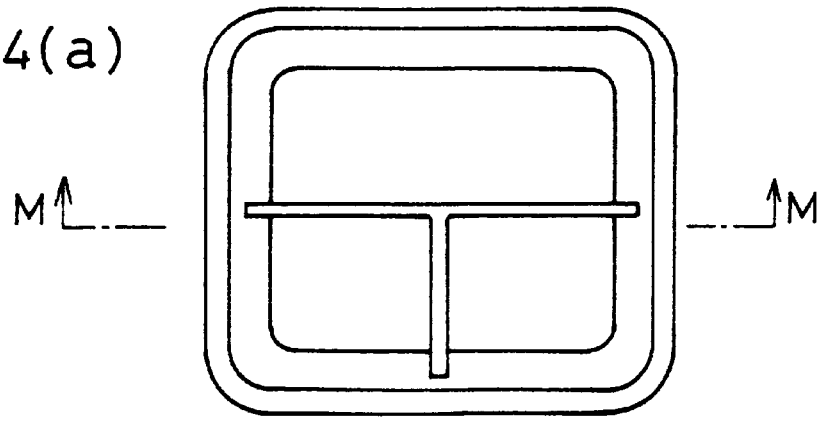
FIG. 14(a) is a plan view illustrating another arrangement of a biodegradable molded object.
Figure 14B:
FIG. 14(b) is a cross-sectional view along an M—M arrow line of FIG. 14(a).

The object shape (1) is a shape like that shown in FIGS. 13(a) and 13(b). For example, a length of 220 mm, a width of 220 mm, a height of 21.5 mm, and a thickness of 3.5 mm may be used. The object shape (2) is a shape with dividers like that shown in FIGS. 14(a) and 14(b). For example, a length of 220 mm, a width of 220 mm, a height of 21.5 mm, and a thickness of 3.5 mm may be used. Further, the object shape (3) is a shape like that shown in FIG. 15. For example, a length of 100 mm, a width of 100 mm, a height of 100 mm, and a thickness of 50 mm may be used.

Figure 16A:
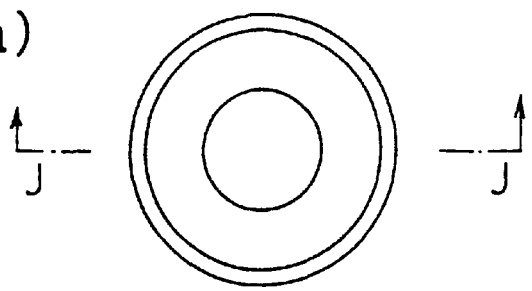
FIG. 16(a) is a plan view illustrating still another arrangement of a biodegradable molded object.
Figure 16B:
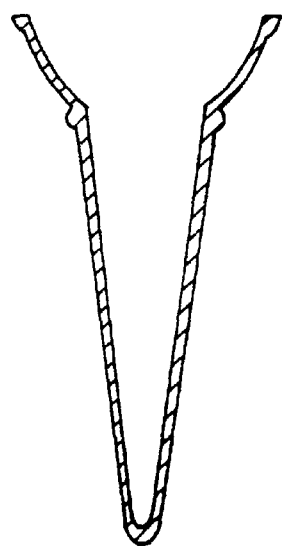
FIG. 16(b) is a cross-sectional view along a J—J arrow line of FIG. 16(a).
Figure 17A:
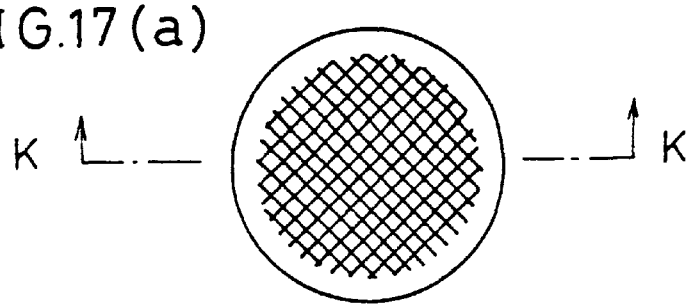
FIG. 17(a) is a plan view illustrating still another arrangement of a biodegradable molded object.
Figure 17B:
FIG. 17(b) is a cross-sectional view along a K—K arrow line of FIG. 17(a).

Further, the object shape (4) is a shape like that shown in FIGS. 16(a) and 16(b). This object shape has, for example, a diameter of 54 mm, a height of 120 mm, and a thickness of 2.0 mm. The object shape (5) is a shape like that shown in FIGS. 17(a) and 17(b). For example, the object shape has a diameter of 150 mm, and a thickness of 2.0 mm.

Since the manner in which the materials expand varies depending on the shapes of the molded object, the vapor release sections, and the surfaces of the mold which are brought in contact with the materials must be changed as necessary, but the method of molding is basically equivalent.

Evaluation

The mold release and maintenance of shape, as well as the strength, consistency, and appearance of the molded objects produced was measured and evaluated. Evaluation of the moldability with regard to the molded objects was made as shown in Table 7.

TABLE 7

EVALUATION OF MOLDABILITY

| EVALUATION | ⊚ | EXCELLENT |
|---|---|---|
| | ○ | CAN BE MOLDED WITH ALMOST NO PROBLEMS |
| | Δ | NEEDS IMPROVEMENT IN MOLD RELEASE, MAINTENANCE OF SHAPE, ETC. |
| | X | CANNOT BE MOLDED |

Evaluation of the properties of the molded objects was made as shown in Table 8.

TABLE 8

EVALUATION OF PROPERTIES OF MOLDED OBJECTS

| PROPERTIES EVALUATED | | STRENGTH, CONSISTENCY, APPEARANCE (SURFACE CONDITION, COLOR) |
|---|---|---|
| EVALUATION | ⊚ | EXCELLENT |
| | ○ | GOOD |
| | Δ | FAIR |
| | X | POOR |

Evaluation of molding balance which is in the molded objects in the case where a plurality of molds were simultaneously used so as to produce the objects was made as shown in Table 9.

TABLE 9

EVALUATION OF MOLDING BALANCE

| EVALUATION | ⊚ | CAN BE EXCELLENTLY MOLDED IN EACH MOLD |
|---|---|---|
| | ○ | CAN BE ALMOST UNIFORMLY MOLDED IN ALL MOLDS |
| | Δ | PROPERTIES VARY WITH POSITIONS OF MOLDS |
| | X | UNCONTROLLABLE SINCE PROPERTIES VARY GREATLY |

Next, several concrete examples will be explained.

EXAMPLE 1

Figure 19:
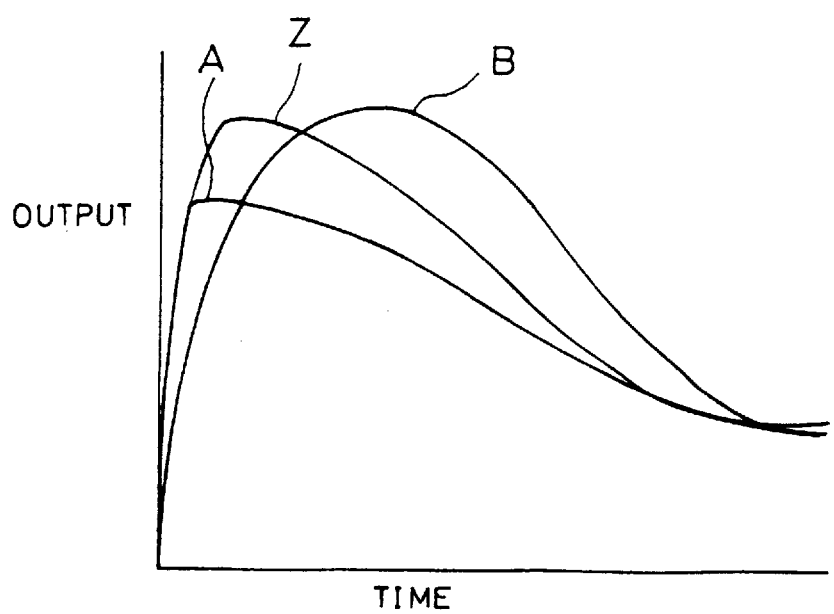
FIG. 19 is a graph illustrating the relationship between output and heating time of a biodegradable molded object.
Figure 20:
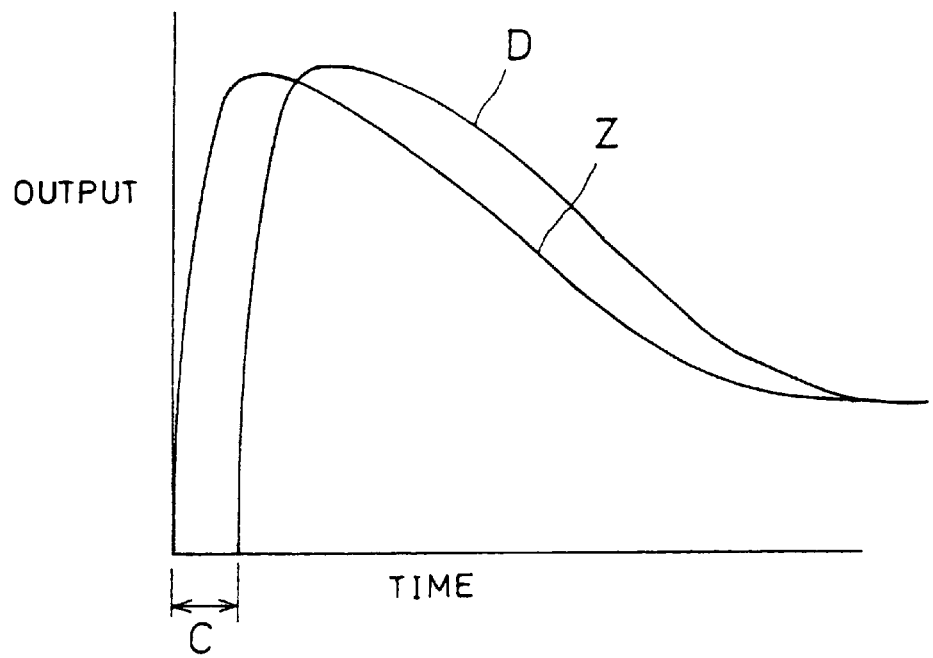
FIG. 20 is a graph illustrating the relationship between output and heating time of a biodegradable molded object.
Figure 21:
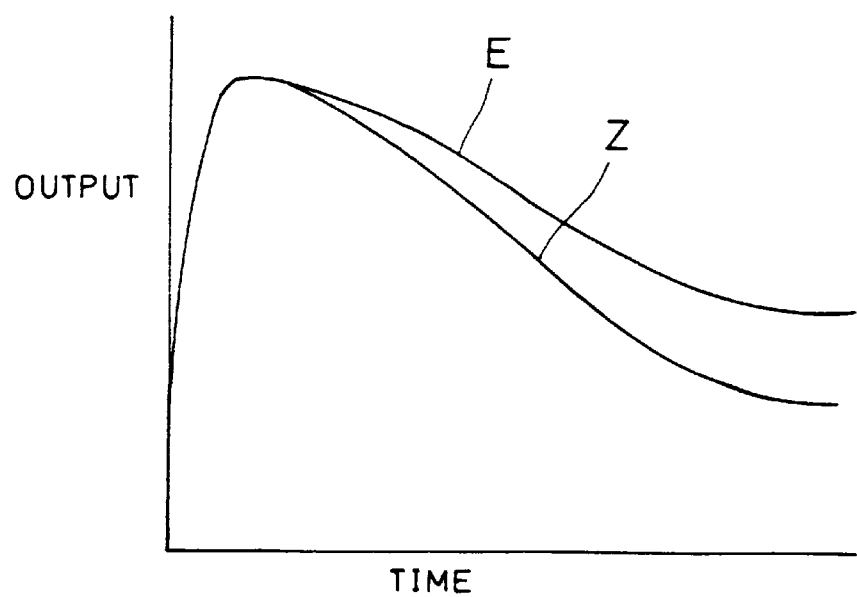
FIG. 21 is a graph illustrating the relationship between output and heating time of a biodegradable molded object.
Figure 22:
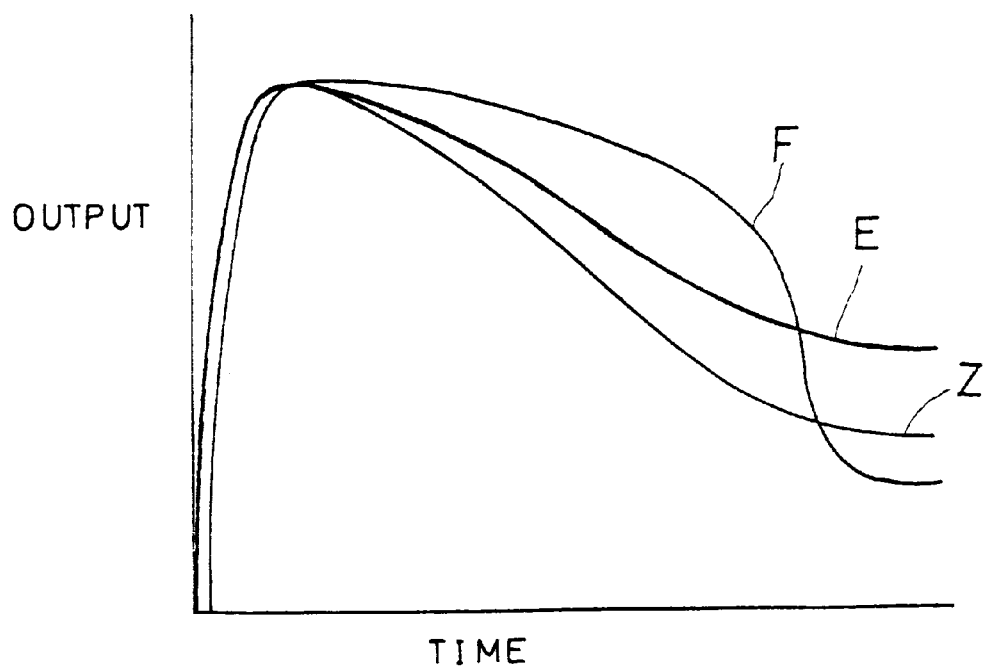
FIG. 22 is a graph illustrating the relationship between output and heating time of a biodegradable molded object.

First, using FIGS. 19 through 21, the following will explain setting of a good oscillator vacuum tube anode current for molding by internal heating (high frequency range).

If a graph is prepared of the relationship between heating time (horizontal axis) and the oscillator vacuum tube anode amperage (output) flowing through the metal mold (vertical axis), there are cases in which, as shown by curve Z in FIG. 19, too much current flows at the commencement of heating, and this excessive current (output) can lead to sparking, burning of the molded object, etc. Possible reasons for this include:

(1) The maximum amperage is too high (output is too large, (2) The materials in the metal mold are in an unstable state;

(3) The quantity of salt contained is too large; and (4) Pressure inside the metal mold is too high.

In such cases, measures are taken such as decreasing the output (as shown by curve A in FIG. 19), making the slope of the increase in current more gradual (as shown by curve B in FIG. 19), etc. Alternatively, as shown by curve D in FIG. 20, measures may be taken to stabilize the state of the ingredients in the initial stage of heating by adding an ingredient stabilization step C in the initial stage of heating. By means of these measures, excessive increase of the anode amperage can be controlled.

As shown by curve E in FIG. 21, in the latter half of heating, there are cases in which the current remains at an unnecessarily high level, and since the amperage during the drying stage is too high, sparking, burning of the molded object, etc. may occur. Possible reasons for this include:

(1) The quantity of salt contained is too large;

(2) The materials contain a large quantity of materials which easily burn; and (3) The quantity of materials is insufficient.

In such cases, as shown by curve Z in FIG. 21, measures are taken to reduce output. Alternatively, as shown by curve F in FIG. 22, measures may be taken to prolong the time the maximum amperage is maintained. By means of these measures, excessive anode amperage in the latter half of heating can be controlled.

By changing the distance between the incoming and feeder sections, the shape and size of the incoming plate and the feeder plate, the connection position of the feeder section, etc., as well as by changing the L component and the C component, the output applied to the materials for the molded objects can be altered.

EXAMPLE 2

Specifications of the present Example were as follows.

Material mixtures: No. 1, 2

Heating method: HC2

Molded object shape: (1)

Herein used were an incoming plate 28 which is 150 mm long (in a travelling direction of the mold during a heating treatment), 120 mm high, and 3 mm thick, and a feeder plate 29 which is 800 mm long, 120 mm high, and 3 mm thick, arranged as shown in FIGS. 6(*a*) through 6(*c*). The feeder plate 29 was arranged so that side portions 29*d* were adjustable so as to have an appropriate space therebetween. An experiment was conducted by varying the width of the space 30 between the incoming plate 28 and the feeder plate 29, so as to check influences of variation of the space width. The result of the experiment is shown in Table 10 below.

TABLE 10

| EXPERIMENT NO. | SPACE WIDTH (mm) | DEGREE OF INSERTION (mm) | INSULATING BODY | MOLD TEMP. (° C.) | MOLDING TIME (sec.) | PROPERTIES | MOLD-ABILITY |
|---|---|---|---|---|---|---|---|
| 2-1 | 15 | 80 | ABSENT | 200 | 70 | ○ | ○ |
| 2-2 | 12 | | | | 65 | ○ | ○ |

TABLE 10-continued

| EXPERIMENT NO. | SPACE WIDTH (mm) | DEGREE OF INSERTION (mm) | INSULATING BODY | MOLD TEMP. (° C.) | MOLDING TIME (sec.) | PROPERTIES | MOLD-ABILITY |
| --- | --- | --- | --- | --- | --- | --- | --- |
| 2-3 | 9 | | | | 60 | ◯ | ◯ |
| 2-4 | 5 | | | | 50 | ◉ | ◉ |

Figure 23:
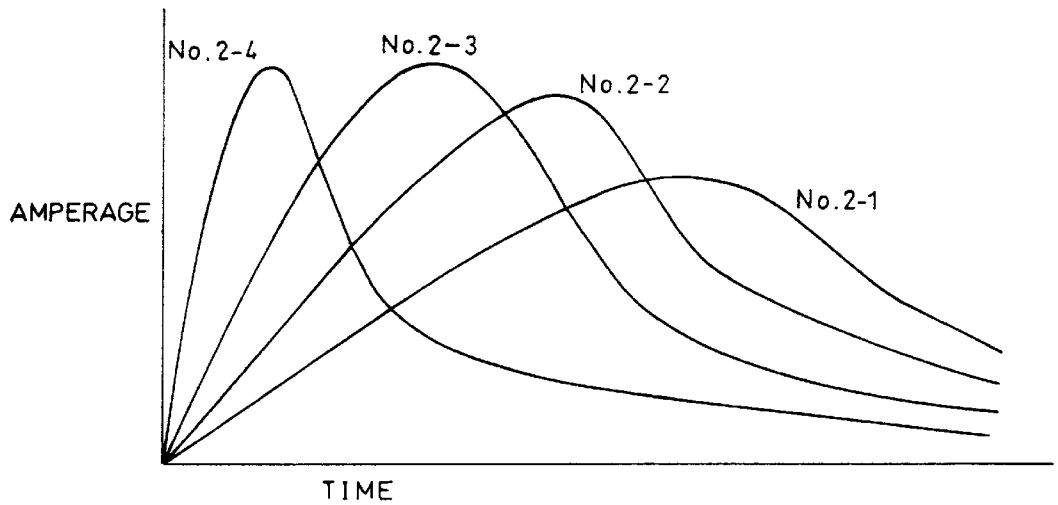
FIG. 23 is a graph illustrating the relationship between amperage and heating time of a biodegradable molded object.

As shown in Table 10 and FIG. 23, by narrowing the space, the anode current more quickly increases, thereby allowing heating and drying within a shorter time. This indicates that heating efficiency is improved and electric loss is reduced. The result also indicates that by using the feeder plate 29 having a structure such that the space is gradually adjusted in a lengthwise direction, i.e., in the travelling direction of the mold during a heating treatment, molding can be performed while continuously and automatically changing heating conditions in accordance with stages of heating. In short, by controlling the space 30 between the incoming plate 28 and the feeder plate 29, molding conditions can be controlled, thereby ensuring stable and efficient molding.

EXAMPLE 3

Specifications of the present Example were as follows.

Material mixture: No. 22

Heating method : HC2 Molded object shape: (4)

Herein used were a 150 mm long, 120 mm high, and 3 mm thick incoming plate 28 with a 150 mm long, 100 mm high, and 1–3 mm thick insulating body 31, and a feeder plate 31 which is 800 mm long, 120 mm high, and 3 mm thick, as shown in FIGS. 11(a) and 11(b). The insulating body 31 was made of Teflon (polytetrafluoroethylene). The feeder plate 29 was arranged so that side portion 29d were adjustable so as to have an appropriate space therebetween. The result of the experiment is shown in Table 11 below.

and drying within a shorter time. This indicates that heating efficiency is improved and electric loss is reduced. Therefore, stable and efficient molding can be performed, by selecting one among insulating bodies 31 having different insulating properties and providing the same in the space 30 between the feeder plate 29 and the incoming plate 28, and controlling molding conditions.

EXAMPLE 4

Specifications of the present Example were as follows.

Material mixture: No. 22

Heating method : HC2

Molded object shape: (4)

Figure 25:
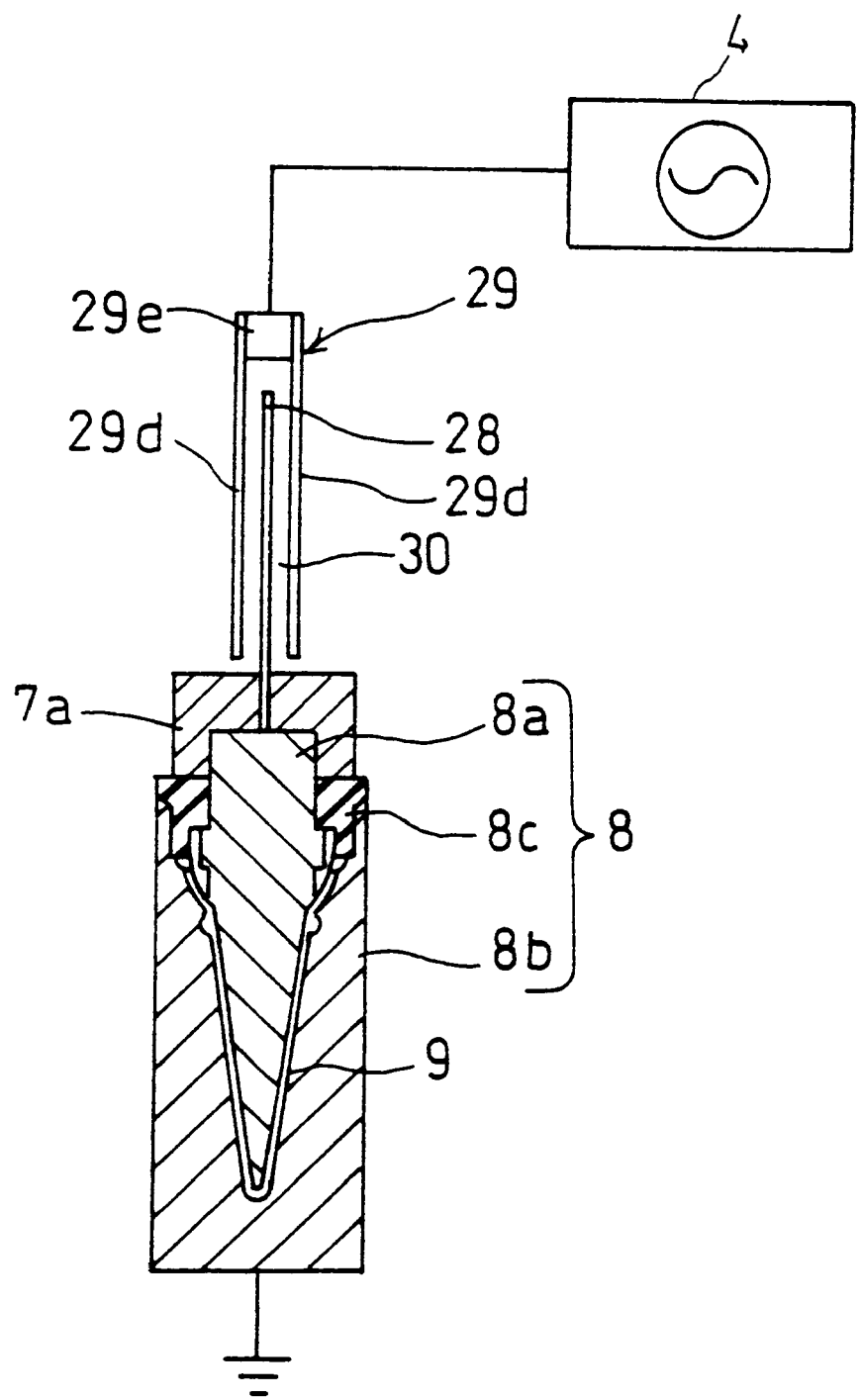
FIG. 25 is a cross-sectional view illustrating still another arrangement of the incoming plate and the feeder plate.
Figure 26:
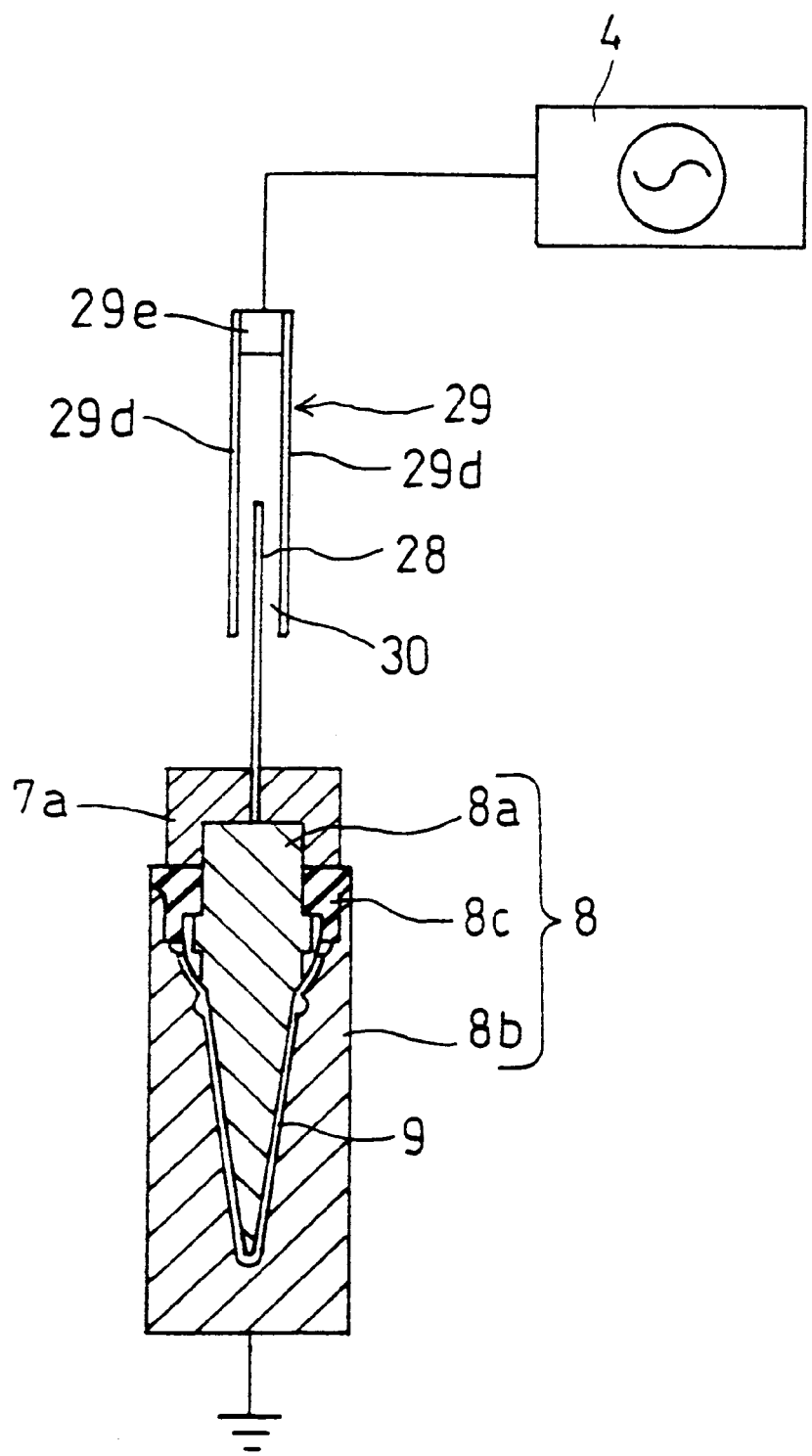
FIG. 26 is a cross-sectional view illustrating still another arrangement of the incoming plate and the feeder plate.

A method herein used for supplying power to the metal mold 8 is shown in FIGS. 25 and 26. FIG. 25 shows a stage where the incoming plate 28 and the feeder plate 29 overlap each other to a great extent, while FIG. 26 shows a state where they overlap each other to a small extent.

As shown in FIGS. 25 and 26, a 150 mm long, 120 mm high, and 3 mm thick incoming plate 28 was inserted into a space 30 between side portion 29d of a 800 mm long, 120 mm high, and 3 mm thick feeder plate 29. By moving the feeder plate 29 upward and downward, a power-supplied area which was an overlapped area was varied, and influences of variation of the power-supplied area were checked. The result of the experiment is shown in Table 12 below.

TABLE 11

| EXPERIMENT NO. | SPACE WIDTH (mm) | DEGREE OF INSERTION (mm) | INSULATING BODY | MOLD TEMP. (° C.) | MOLDING TIME (sec.) | PROPERTIES | MOLD-ABILITY |
| --- | --- | --- | --- | --- | --- | --- | --- |
| 3-1 | 15 | 80 | ABSENT | 200 | 35 | ◯ | ◯ |
| 3-2 | 5 | | | | 30 | ◯ | ◯ |
| 3-3 | 15 | | PRESENT | | 25 | ◯ | ◯ |
| 3-4 | 5 | | | | 20 | ◉ | ◉ |

Figure 24:
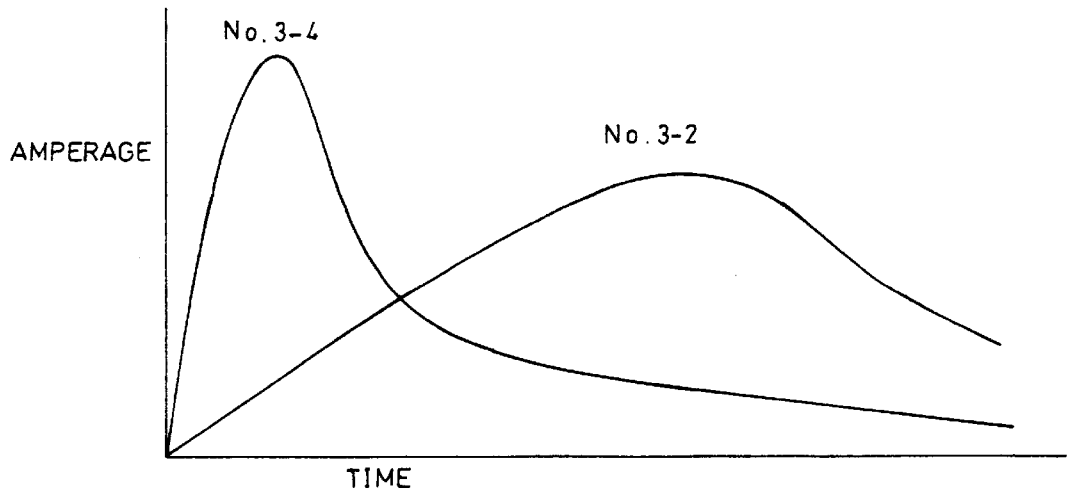
FIG. 24 is a graph illustrating the relationship between amperage and heating time of a biodegradable molded object.

As shown in Table 11 and FIG. 24, by providing the insulating body 31 in the space 30 (see FIG. 6(b)), the anode current more quickly increases, thereby allowing heating Incidentally, the oscillator 4 may have a structure in which the variable capacitor 5 and the variable coil 6 as a regulating circuit, as shown in FIGS. 1 and 3, are incorporated.

TABLE 12

| EXPERIMENT NO. | SPACE WIDTH (mm) | DEGREE OF INSERTION (mm) | INSULATING BODY | MOLD TEMP. (° C.) | MOLDING TIME (sec.) | PROPERTIES | MOLD-ABILITY |
| --- | --- | --- | --- | --- | --- | --- | --- |
| 4-1 | 5 | 80 | PRESENT | 200 | 20 | ◉ | ◉ |
| 4-2 | | 60 | | | 25 | ◉ | ◉ |
| 4-3 | | 40 | | | 35 | ◯ | ◯ |
| 4-4 | | 80 | ABSENT | | 30 | ◯ | ◯ |
| 4-5 | | 60 | | | 35 | ◯ | ◯ |
| 4-6 | | 40 | | | 40 | ◯ | ◯ |

Figure 27:
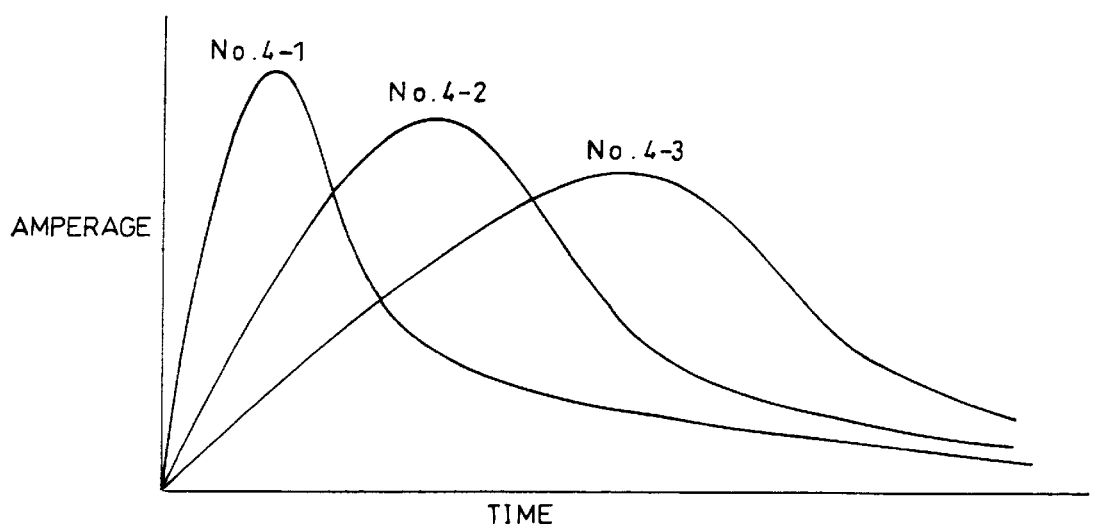
FIG. 27 is a graph illustrating the relationship between amperage and heating time of a biodegradable molded object.

As shown in Table 12 and FIG. 27, as the power-supplied area, that is, the area of the incoming plate 28 overlapped by the feeder plate 29, expands, the anode current more quickly increases, thereby allowing heating and drying within a shorter time. This indicates that heating efficiency is improved and electric loss is reduced.

On the other hand, as the power-supplied area decreases, the anode current more slowly increases, thereby suppressing initial conduction. As a result, better molded objects can be obtained.

In this present example, the power-supplied area is varied by varying the degree of insertion of the incoming plate 28 to the feeder plate 29, not varying the size of the incoming plate 28. To reduce the power-supplied area, however, the size of the incoming plate 28, that is, the area thereof, may be reduced. If the size of the incoming plate 28 is reduced, it is possible to suppress, not only the initial conduction, but also emission of heat from the metal mold 8 through the incoming plate 28.

Two types of incoming plates 28 differing in size as follows were used in a manner as shown in Table 13: one type (SMALL) was 150 mm long, 120 mm high, and 3 mm thick, while the other one (LARGE) was 300 mm long, 120 mm high, and 3 mm thick. A feeder plate 29 which was 800 mm long, 120 mm high, 3 mm thick was used. The result is shown in Table 13.

Incidentally, the oscillator 4 may have a structure in which the variable capacitor 5 and the variable coil 6 as a regulating circuit, as shown in FIGS. 1 and 3, are incorporated.

TABLE 13

| EXPERIMENT NO. | SIZE/NUMBER OF INCOMING PLATES | POSITION OF INCOMING PLATES | INSULATING BODY | MOLD TEMP. (° C.) | MOLDING TIME (sec.) | PROPERTIES | MOLD-ABILITY | MOLDING BALANCE |
|---|---|---|---|---|---|---|---|---|
| 5-1 | SMALL/5 | MOLDS A-E | PRESENT | 200 | 20 | ⊚ | ⊚ | ⊚ |
| 5-2 | SMALL/3 | MOLDS A, C, E | | | 25 | ⊚ | ⊚ | ⊚ |
| 5-3 | LARGE/1 | MOLD C | | | 35 | ⊚ | ⊚ | ○ |
| 5-4 | SMALL/1 | MOLD C | | | 40 | ○ | ○ | ○ |
| 5-5 | | MOLD E | | | 40 | ○ | ○ | ○ |
| 5-6 | | MOLD A | | | 40 | ○ | ○ | ○ |

EXAMPLE 5

Specifications of the present Example were as follows.

Material mixture: No. 22

Heating method: HC2

Molded object shape: (4)

Figure 28:
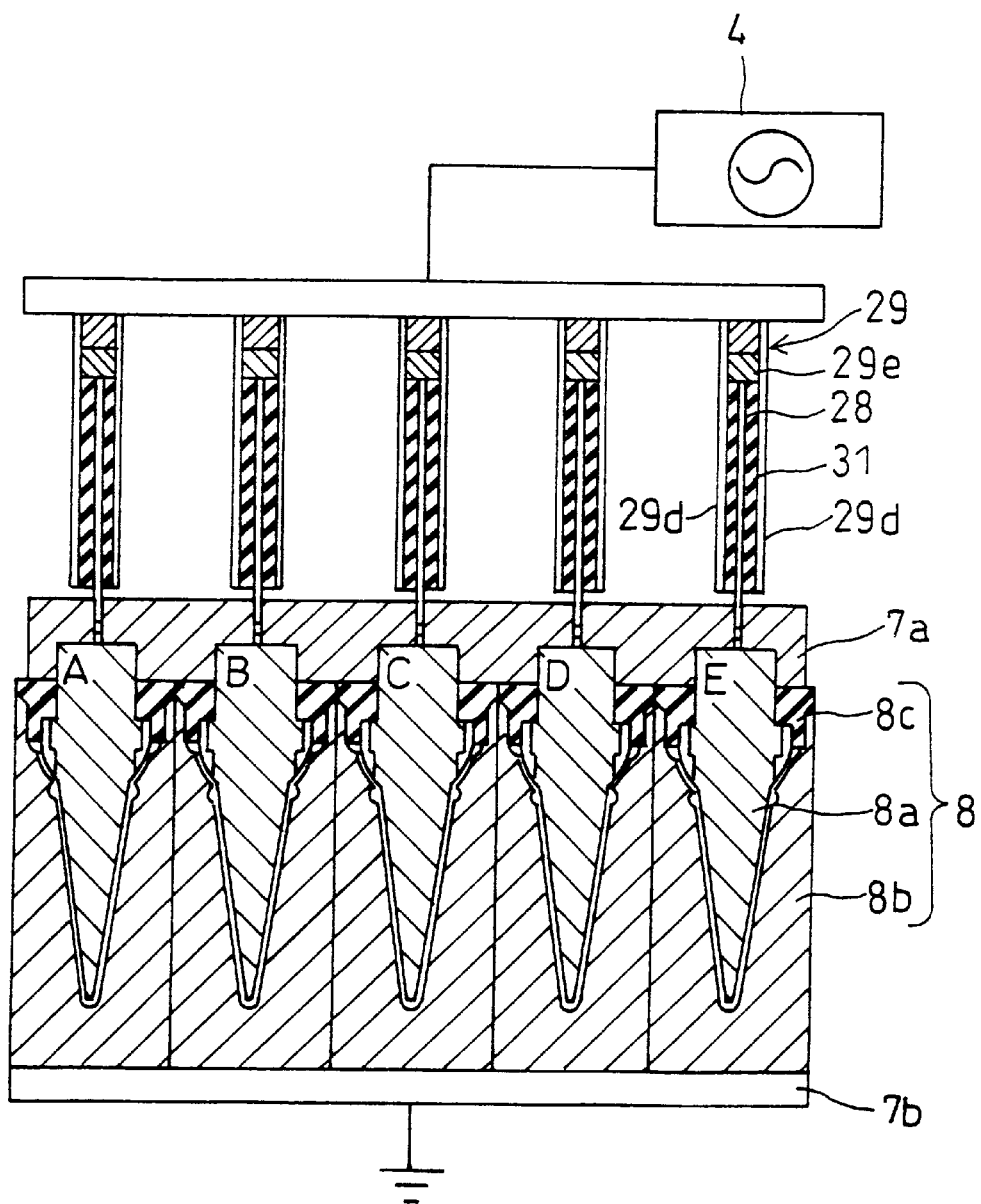
FIG. 28 is a cross-sectional view illustrating still another arrangement of the incoming plate and the feeder plate.
Figure 29:
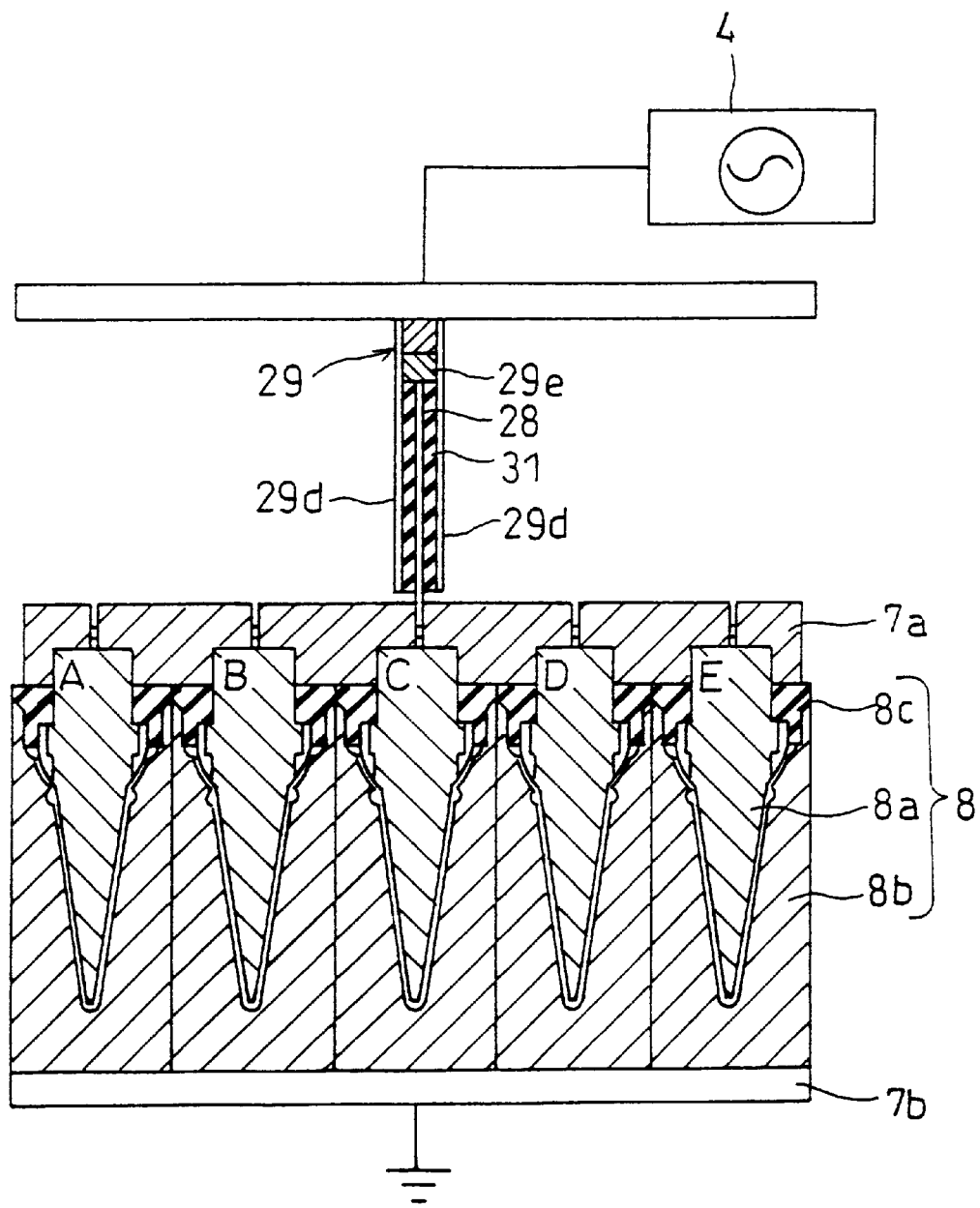
FIG. 29 is a cross-sectional view illustrating still another arrangement of the incoming plate and the feeder plate.

A method herein used for simultaneously heating five of the metal molds 8 is shown in FIGS. 28 and 29. A plurality, i.e. five in this case, of the metal molds 8 are linearly aligned in a direction orthogonal to the travelling direction of the metal molds 8 during a heating treatment. The five metal molds 8 are fixed to each other, thereby forming one composite mold.

In an example shown in FIG. 28, five incoming plates 28 are used, which are connected with mold halves 8a, respectively.

In an example shown in FIG. 29, one incoming plate 28 is used, which is connected with five metal halves 8a through an electrode 7a.

Alternatively, a smaller number of the incoming plates 28 than the number of the metal molds 8 may be used. Specifically, as a hybrid modification of the examples shown in FIGS. 28 and 29, two to four incoming plates 28 are installed on any ones of five mold halves 8a, respectively, so that alternating current is applied to the five metal molds 8 through the incoming plates 28.

Alternatively, a greater number of the incoming plates 28 than the number of the metal molds 8 may be used. Specifically, a plurality of the incoming plates 28 are installed on each mold half 8a so that, for example, alternating current is applied to five metal molds 8 through ten incoming plates 28.

Figure 30:
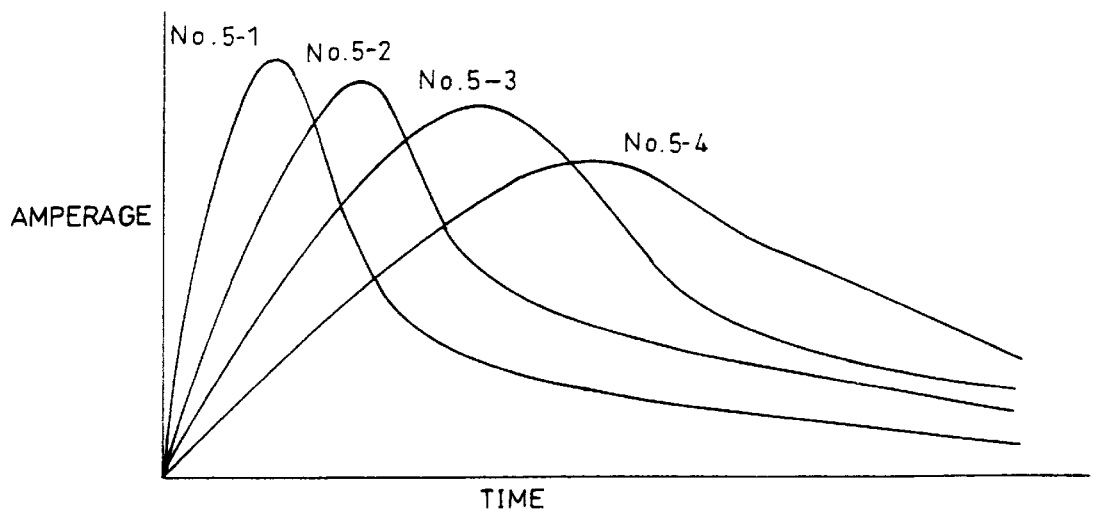
FIG. 30 is a graph illustrating the relationship between amperage and heating time of a biodegradable molded object.

As shown in Table 13 and FIG. 30, as the number of incoming plates 28 increases, the anode current more quickly increases, thereby allowing heating and drying within a shorter time. In the case where the incoming plate 28 has a greater size so as to have a larger area (power-supplied area) overlapped by the feeder plate 29, moldability similar to that in the case where a plurality of the incoming plates 28 are provided can be achieved.

In the case where at least one incoming plate 28 was combined with each mold 8, heated and dried states of individual molded objects obtained were uniform, indicating that molding was performed in the most desirably balanced manner. In the case where the number of the incoming plates 28 is small, however, molding can be performed in a balanced manner.

Furthermore, the incoming plate 28 may be installed at any position, and the position of the incoming plate 28 hardly affects whether or not molding is performed in a balanced manner.

By decreasing the number of the incoming plate 28, the following effects can be achieved: good operability of the device; suppression of heat emission from the metal molds 8; and suppression of initial conduction.

A high frequency output is proportional to a total area of the incoming plate 28 overlapped by the feeder plate 29.

EXAMPLE 6

Specifications of the present Example were as follows.

Material mixture: No. 3

Heating method : shown in Tables 14 and 15

Molded object shapes: (1), (2)

TABLE 14

OBJECT SHAPE (1)

| | CONDITIONS | | | RESULTS | | |
|---|---|---|---|---|---|---|
| | | REDUCTION | MOLD | LIQUID CONTENT (%) | | |
| EXPERIMENT NO. | HEATING DEVICE | OF AIR PRESSURE | TEMPERATURE (° C.) | AFTER 10 SECONDS | AFTER 30 SECONDS | FINAL |
| 6-1 | HC1 | YES | 80 | 13.2 | 8.2 | 2.5 |
| 6-2 | | NO | 140 | 10.2 | 5.5 | 3.0 |
| 6-3 | | NO | 200 | 8.5 | 4.1 | 2.9 |
| 6-4 | HC2 | YES | 80 | 6.7 | 4.2 | 2.9 |
| 6-5 | | NO | 140 | 5.9 | — | 2.9 |
| 6-6 | | NO | 200 | 5.1 | — | 1.8 |
| 6-7 | HC3 | YES | 80 | 6.5 | 2.0 | 2.0 |
| 6-8 | | NO | 140 | 4.8 | — | 2.0 |
| 6-9 | | NO | 200 | 3.7 | — | 2.3 |

RESULTS

| EXPERIMENT NO. | MOLDING TIME (sec.) | PROPERTIES | MOLD-ABILITY | NOTE |
|---|---|---|---|---|
| 6-1 | 120 | ⊚ | ○ | |
| 6-2 | 100 | ⊚ | ○ | |
| 6-3 | 70 | ⊚ | ⊚ | |
| 6-4 | 80 | ⊚ | ○ | |
| 6-5 | 40 | ⊚ | ⊚ | |
| 6-6 | 35 | ⊚ | ⊚ | |
| 6-7 | 60 | ⊚ | Δ | SPARKING IS LIKELY |
| 6-8 | 30 | ○ | Δ | SPARKING IS LIKELY |
| 6-9 | 25 | ○ | Δ | SPARKING IS LIKELY |

TABLE 15

OBJECT SHAPE (2)

| | CONDITIONS | | | RESULTS | | |
|---|---|---|---|---|---|---|
| | | REDUCTION | MOLD | LIQUID CONTENT (%) | | |
| EXPERIMENT NO. | HEATING DEVICE | OF AIR PRESSURE | TEMPERATURE (° C.) | AFTER 10 SECONDS | AFTER 30 SECONDS | FINAL |
| 6-8 | HC1 | YES | 80 | 14.2 | 8.7 | 2.8 |
| 6-9 | | NO | 140 | 11.2 | 6.0 | 3.3 |
| 6-10 | | NO | 200 | 9.5 | 4.6 | 3.2 |
| 6-11 | HC2 | YES | 80 | 7.7 | 4.7 | 3.2 |
| 6-12 | | NO | 140 | 6.9 | — | 3.2 |
| 6-13 | | NO | 200 | 6.1 | — | 2.1 |
| 6-14 | HC3 | YES | 80 | 7.5 | 2.5 | 2.3 |
| 6-15 | | NO | 140 | 5.8 | — | 2.3 |
| 6-16 | | NO | 200 | 4.7 | — | 2.6 |

RESULTS

| EXPERIMENT NO. | MOLDING TIME (sec.) | PROPERTIES | MOLD-ABILITY | NOTE |
|---|---|---|---|---|
| 6-8 | 120 | X | X | DIVIDERS HALF-BAKED |
| 6-9 | 100 | ○ | Δ | DIVIDERS SLIGHTLY HALF-BAKED |
| 6-10 | 70 | ⊚ | ⊚ | |
| 6-11 | 80 | X | X | DIVIDERS HALF-BAKED |
| 6-12 | 40 | ○ | ○ | |
| 6-13 | 35 | ⊚ | ⊚ | |

TABLE 15-continued

| OBJECT SHAPE (2) | | | | |
|---|---|---|---|---|
| 6-14 | 60 | X | X | DIVIDERS HALF-BAKED |
| 6-15 | 30 | ○ | ○ | |
| 6-16 | 25 | ○ | △ | |

The results of the foregoing evaluations are as follows.

The higher the frequency is set, the shorter the molding time, the moldability, and the properties of the molded objects tend to improve. However, if the frequency is set too high, sparking is likely, and it becomes difficult to control sparking.

If molding time is shortened, the materials expand quickly, and the molded object tend to become physically weaker. Accordingly, in this case, it is necessary to select a material mixture which does not easily expand and is not likely to form keloids on its surface.

When external and internal heating is combined, duration of molding is markedly shortened.

Comparing Tables 14 and 15, it is evident that the difficulty of applying voltage to the divider portions makes it difficult to induce internal heating, and the divider portions may be only half-baked. This naturally impairs the properties and moldability of the molded object. Since the divider portions are enclosed in the interior of one of the mold halves, when a voltage is applied to the metal mold, it is difficult to apply voltage to the dividers, and internal heating is difficult to induce. In a case like this, when a shape has portions which do not heat internally, external heating is generally also used. Further, it is also necessary to ensure that heating in these portions is equal to that in the internally heated portions by designing the metal mold so that its thickness at the portions which do not heat internally is thinner than elsewhere. Another effective measure is to make it easier to apply voltage to the divider portions by adjusting the arrangement of the insulating section and the conductive body in the vicinity of the divider portions of the materials.

EXAMPLE 7

Specifications of the present Example were as follows.
Material mixtures: No. 1 through No. 36.
Object shapes: (1) through (5).
Heating method: HC2

TABLE 16

| EXPERIMENT NO. | MATERIAL MIXTURE NO. | SHAPE | HEATING DEVICE | PROPERTIES | MOLD-ABILITY | NOTE |
|---|---|---|---|---|---|---|
| 7-1 | 1 | (1), (2), (3) | HC2 | ⊚ | ⊚ | |
| 7-2 | 2 | | | ⊚ | ⊚ | |
| 7-3 | 3 | | | ⊚ | ⊚ | |
| 7-4 | 4 | | | ⊚ | ⊚ | |
| 7-5 | 5 | | | ⊚ | ⊚ | |
| 7-6 | 6 | | | ○ | ⊚ | |
| 7-7 | 7 | | | ⊚ | ⊚ | |
| 7-8 | 8 | | | ○ | ⊚ | |
| 7-9 | 9 | | | ⊚ | ⊚ | |
| 7-10 | 10 | | | ⊚ | ⊚ | |
| 7-11 | 11 | | | ⊚ | ⊚ | |
| 7-12 | 12 | | | ⊚ | ⊚ | |
| 7-13 | 13 | | | ○ | ⊚ | |
| 7-14 | 14 | | | ⊚ | ⊚ | |
| 7-15 | 15 | | | ⊚ | ⊚ | |
| 7-16 | 16 | | | ⊚ | ⊚ | |
| 7-17 | 17 | | | ⊚ | ⊚ | |
| 7-18 | 18 | | | ⊚ | ⊚ | |
| 7-19 | 19 | | | ⊚ | ⊚ | |
| 7-20 | 20 | | | ⊚ | ⊚ | |
| 7-21 | 21 | | | ⊚ | ⊚ | |

TABLE 17

| EXPERIMENT NO. | MATERIAL MIXTURE NO. | SHAPE | HEATING DEVICE | PROPERTIES | MOLD-ABILITY | NOTE |
|---|---|---|---|---|---|---|
| 7-22 | 22 | (4), (5) | HC2 | ⊚ | ⊚ | |
| 7-23 | 23 | | | ⊚ | ⊚ | |
| 7-24 | 24 | | | ⊚ | ⊚ | |
| 7-25 | 25 | | | ⊚ | ⊚ | |
| 7-26 | 26 | | | ⊚ | ⊚ | |
| 7-27 | 27 | | | ○ | ⊚ | |
| 7-28 | 28 | | | ○ | ⊚ | |
| 7-29 | 29 | | | ○ | ⊚ | |

TABLE 17-continued

| EXPERIMENT NO. | MATERIAL MIXTURE NO. | SHAPE | HEATING DEVICE | PROPERTIES | MOLD-ABILITY | NOTE |
|---|---|---|---|---|---|---|
| 7-30 | 30 | | | ⊚ | ⊚ | |
| 7-31 | 31 | | | ◯ | ⊚ | |
| 7-32 | 32 | | | ⊚ | ⊚ | |
| 7-33 | 33 | | | ⊚ | ⊚ | |
| 7-34 | 34 | | | ⊚ | ⊚ | |
| 7-35 | 35 | | | ⊚ | ⊚ | |
| 7-36 | 36 | (5) | | ⊚ | ⊚ | |

An experiment was conducted by using various material mixtures, and properties of molded objects obtained were checked. As a result, as to every material mixture, a molded object superior in moldability and physical properties was obtained, as shown in Tables 16 and 17.

EXAMPLE 8

Specifications of the present Example were as follows.

Material mixture: No. 22.

Heating method: HC2

Object shape: (4)

The results of the experiment are as follows.

In the present example, a set of five metal molds 8 was treated as one unit, and a plurality of such units were sequentially heated.

Figure 31:
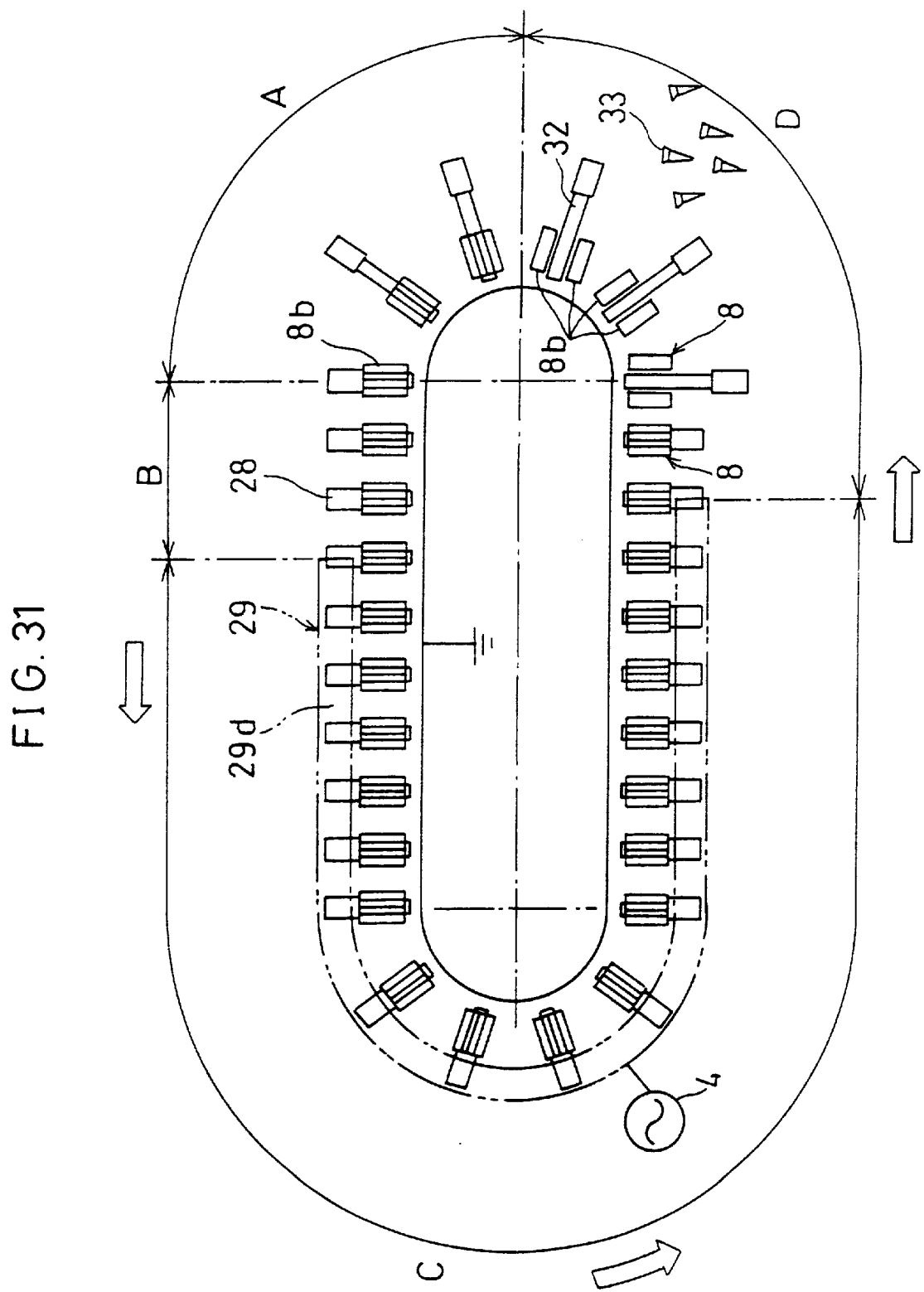
FIG. 31 is an explanatory view illustrating a schematic arrangement of a serial molding device for molding by a serial power supply method.

FIGS. 31 is a cross-sectional view of a serial molding device in a perpendicular direction, and explains how the metal molds 8 are sequentially heated in the serial molding device. Here, 28 composite molds, each being composed of five metal molds 8, are used. The composite molds are transported by a belt conveyer (not shown) along a circulating path shown in FIG. 31. By doing so, the materials in the metal molds 8 are subject to treatment continuously and sequentially, like Step A→Step B→Step C→Step D→Step A→Step B . . . Voided arrows indicate a travelling direction of the metal molds 8, and the metal molds 8 are transported in this direction in a state where 5 of them are lined in a row as one unit.

Since the circulating path is positioned on a vertical plane, the circulating path occupies only a small area in a site where the manufacturing device is located.

The steps in the treatment process is as follows.

Step A is a material placing step. In Step A, after a pair of lower mold pieces 8b are combined, a material mixture is injected into the metal mold 8, and thereafter an upper mold piece and the lower mold pieces are closed.

Steps B and C are heating steps. In Step B, the external heating is performed. In Step C, high-frequency heating as dielectric heating is performed. In Step C, all the incoming plates 28 present in the area for Step C are overlapped by the five corresponding feeder plates 29 with spaces therebetween, respectively.

Step D is a step of discharging molded objects. In Step D, the metal molds 8 are opened, and molded objects obtained when molding is perfected through the above heating steps are taken out therefrom.

These steps constitute a molding process, and Steps A, B, C, D are continuously performed in this order. In other words, a position for Step D which is the final step of using the metal molds 8 and a position for Step A which is the first step of using the metal molds 8 come next to each other in the circulating path. Therefore, the metal molds 8 after Step D which are in an opened state are swiftly moved to the position for Step A along the circulating path, and without cessation, the material mixture for the molded objects to be formed next is placed therein.

The feeder plate 29 is formed in a U shape as shown in FIG. 31, so as to be provided along the circulating path. Five of such feeder plates 29 are disposed parallel to the circulating path. Therefore, the metal molds 8 are moved in a horizontal direction in Step B and an initial stage of Step C. In a middle stage of Step C, the metal molds 8 are turned through 180°, around as an axis a line connecting the five metal molds 8 in one unit, thereby becoming upside down as compared with the previous state. Thus making a U-turn, the metal molds 8 become subject to a final stage of Step C, then, to Step D. Perfected molded objects are discharged at Step D, and thereafter the metal molds 8, again turned through 180°, proceed to Step A. Thus, the metal molds 8 are circulated.

The incoming plates 28 and the feeder plates 29 are not brought in direct contact with each other when, after Step B, the metal molds 8 becomes subject to dielectric heating in step C wherein the feeder plates 29 are used. Therefore, sparking and the like do not occur. This makes it possible to apply alternating current to the feeder plates 29 in Step C at all times. As a result, efficient serial processing can be realized.

Incidentally, the oscillator 4 may have a structure in which the variable capacitor 5 and the variable coil 6 as a regulating circuit, as shown in FIGS. 1 and 3, are incorporated.

As shown in FIGS. 32(*a*) and 32(*b*), the metal molds 8, that is, mold 8a and 8b constituting the metal molds 8, are prepared. FIG. 32(*a*) shows a state thereof in Steps B and C where the metal molds 8 are closed, while FIG. 32(*b*) shows a state thereof in Step D where the metal molds 8 are opened.

Here, five of the metal molds 8 are treated as one unit as (described above, and the metal molds 8 constituting one unit are lined in a direction orthogonal to the travelling direction of the metal molds 8 during a heating treatment, fixed to each other, thereby forming a composite mold. Note that the metal molds 8 may not necessarily be lined in a row crosswise, but may be disposed in any manner provided that the position relationship of the metal molds 8 in the unit is uniform.

Each lower mold half 8b is divided into two pieces, and corresponding five pieces in one unit are combined, thereby forming one member which is hereinafter referred to as lower mold half piece 8b.

To move the metal molds 8 along the circulating path by the foregoing belt conveyer (not shown) or the like, a slide bar 32 is provided. The slide bar 32 is to hold and transport the metal molds 8, and is formed in a shape extended in a direction orthogonal to the travelling direction of the metal molds 8. A guide 36 is movably provided to the slide bar 32, so as to move upward and downward in a lengthwise direction of the slide bar 32. The guide 36 is equipped with a supporter 35, and the incoming plates 28 and the metal halves 8a are installed on the supporter 35, with later-described insulating bodies 8c therebetween respectively.

In molding, in Step A (see FIG. 31), the material mixture is placed in the metal molds 8, the five mold halves 8a are supported by the supporter 35, and the mold halves 8a and the mold half pieces 8b are clamped by a lock 34. Thus, closing the upper mold halves 8a and the lower mold half pieces 8b is performed.

The insulating body 8c is installed between the mold halves 8a and the supporter 35, and by doing so, all the members other than the incoming plates 28 and the upper mold halves 8a are on the ground side. Therefore, the closing of the upper mold halves 8a and the lower mold half pieces 8b can be easily conducted.

After the closing, the metal molds 8 are subject to the external heating (Step B) and the high-frequency heating (Step C). Through these steps, the material mixture is heated and dried, and molded objects are formed inside the metal molds 8.

After the heating steps, in Step D, the lock 34 is unlocked, and the supporter 35 is brought up by the slide bar 32. By separating the lower mold half pieces 8b, molded objects 33 shown in FIG. 31, are taken out from inside.

Figure 33:
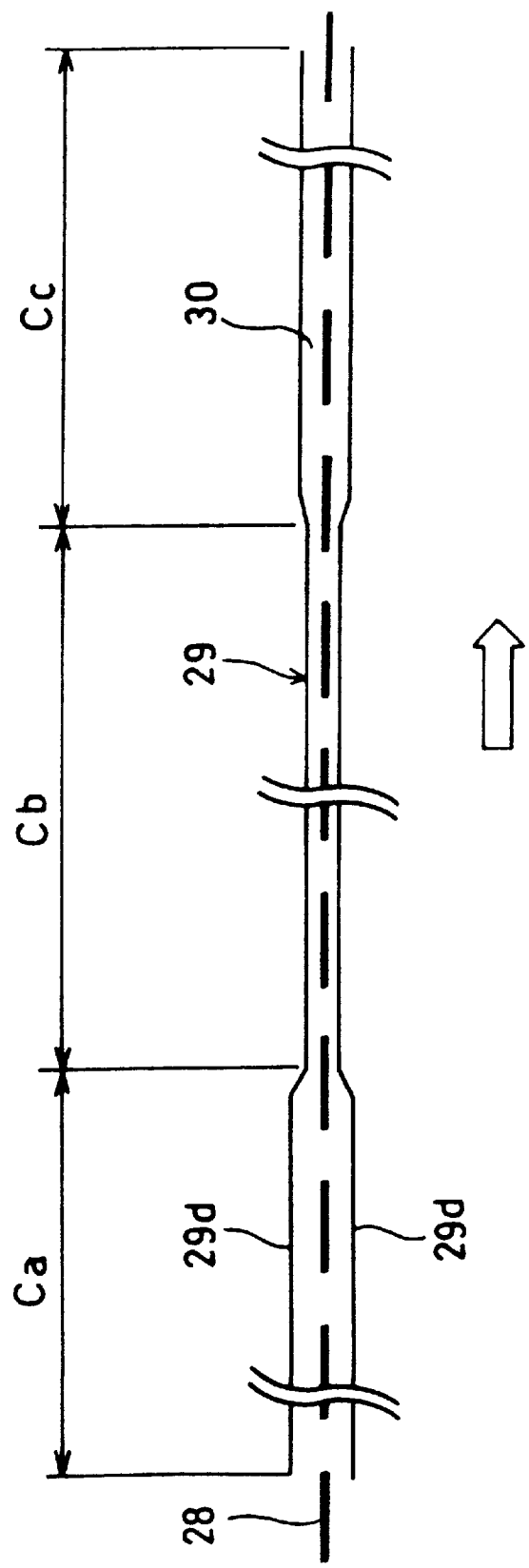
FIG. 33 is an explanatory view illustrating an example of position relationship between an incoming section and a feeder section for use in the serial molding device shown in FIG. 31, when the feeder section used therein is imaginarily deformed straight.
Figure 34:
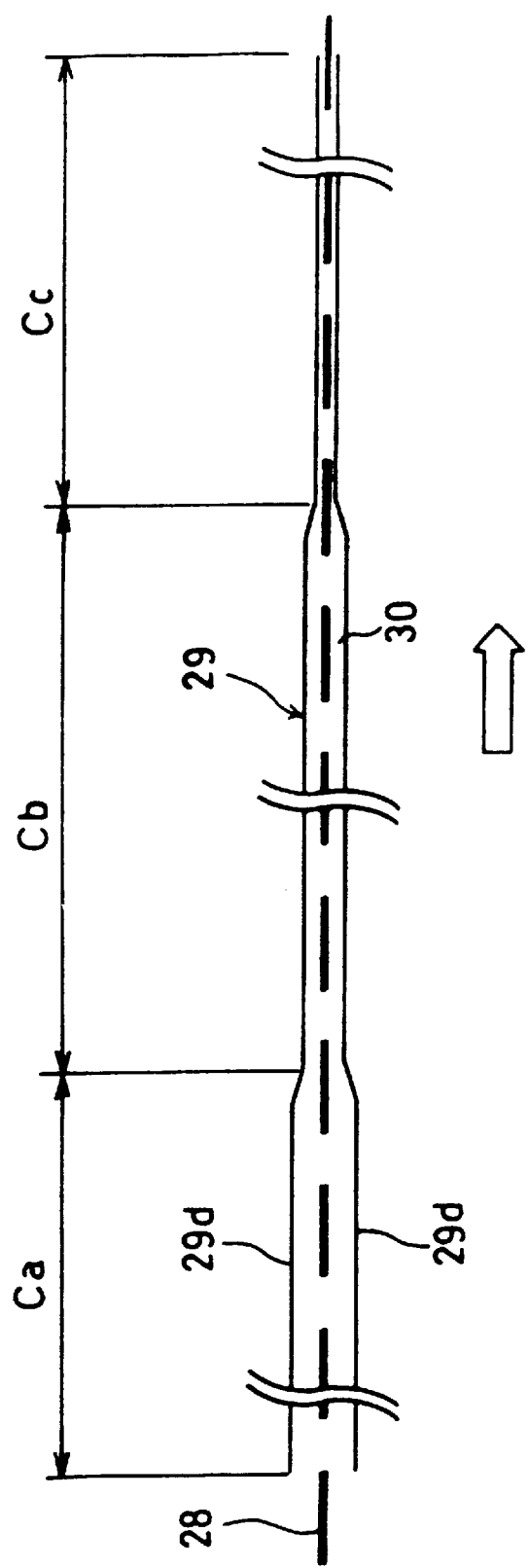
FIG. 34 is an explanatory view illustrating another example of position relationship between the incoming section and the feeder section for use in the serial molding device shown in FIG. 31, when the feeder section used therein is imaginarily deformed straight.

FIGS. 33 and 34 are explanatory views illustrating examples of relationship between an incoming section 28 and a feeder section 29 for use in the serial molding device shown in FIG. 31 when the feeder section 29 used therein is imaginarily deformed straight. FIGS. 33 and 34 are views obtained if the incoming plates 28 and the feeder plate 29 in Step C are viewed from a center of circulation of the circulating path shown in FIG. 31. A voided arrow indicates a travelling direction of the metal molds 8.

As shown in FIGS. 33 and 34, the step C is divided into an initial sub-step Ca, a middle sub-step Cb, and a final sub-step Cc which are performed in this order. At each sub-step, the space 30 between the incoming section 28 and the feeder plate 29 is altered. Thus, power supply control is performed by gradually altering the space 30 according the sub-steps.

Generally, after the material mixture is placed in the metal molds 8, dehydration is promoted as the molding is promoted, and the liquid content in the material mixture lowers. Therefore, the dielectric constant inside the metal molds 8 also gradually lowers. Then, in the structures shown in FIGS. 33 and 34, the space 30 is adjusted in accordance with a state of the material mixture at each stage, so that current supplied from the alternating power source is controlled. FIG. 33 shows an example wherein the space 30 is most narrowed at the middle stage of the molding, so that the supplied power becomes greatest at the middle stage of the molding. FIG. 34 shows an example wherein the space 30 is narrowed gradually as the molding is promoted, so that the supplied power gradually increases along with the promotion of molding.

Furthermore, in the case of the regulating circuits shown in FIGS. 1 through 4, in order to appropriately apply current in accordance with variation of the dielectric constant due to changes in the state of the materials in addition to simply altering the quantity of the supplied power, separate oscillating circuits in accordance with the respective steps are needed. However, in the present example wherein the space between the feeder plate 29 and the incoming plate 28 is altered, optimal current can be supplied from one oscillating circuit in accordance with the respective steps. The space between the feeder plate 29 and the incoming plate 28 is gradually altered in FIGS. 33 and 34, but other methods are also effective. For example, an insulating body may be inserted between the feeder plate 29 and the incoming plate 28 at a stage of increasing the supplied power, or the power-supplied area of the incoming plate 28 which is overlapped by the feeder plate 29 may be gradually varied.

Furthermore, the feeder plates 29 of the metal molds 8 in one unit may have different structures including the structures shown in FIGS. 33 and 34, and others. For example, in five metal molds 8 in one unit, the feeder plates 29 of one specific structure may be adopted to the metal molds 8 at the right and left ends, and the feeder plates 29 of other structures may be adopted to the other three metal molds 8.

In cases of the regulating circuits shown in FIGS. 1 through 4, the amperage of the current can be controlled if only one metal mold 8 is provided. However, to accurately control respective amperages with respect to a plurality of metal molds 8 in one composite mold as in the present example, separate oscillating circuits are required in accordance with positions of the objects of power supply. For example, in the case of five metal molds 8 as shown in FIGS. 32(a) and 32(b), separate oscillating circuits have to be used in accordance of positions of the objects of power supply, such as right end, second from right, middle, second from left, and Left end. Therefore, control to achieve the molding in a well-balanced manner with respect to the metal molds is difficult.

In contrast, according to the method in the present example, only one oscillating circuit (oscillating unit) 4 is required, and the method is sufficiently effective so that molding is performed with respect to the metal molds in one composite mold in a well-balanced manner.

By the method, molded objects with excellent moldability and physical properties, which were substantially equal to those of the examples 3 and 5, were obtained.

Incidentally, as the number of the metal molds 8 on the line increases, the output of the oscillating circuit 4 has to be increased.

The heating control greatly depends on the shape of the molded objects and the material mixture for the molded objects, and the heating should not be controlled only by the method shown in FIGS. 33 and 34.

As described above, the first method of the present invention for manufacturing biodegradable molded objects is characterized by comprising the steps of: (a) placing materials having biodegradability in a mold made up of first and second conductive mold halves and an insulating section therebetween, and (b) applying across both the mold halves alternating current from an alternating current power source, thus heating and expanding the materials by means of dielectric heating, wherein (i) the first mold half is provided with a conductive incoming section, (ii) a conductive feeder section is provided in parallel with the incoming section, so as to be not in contact with the incoming section, and (iii) in the step (b), the materials are heated and expanded by means of the dielectric heating, by moving the mold containing the materials in a predetermined direction, and by applying the alternating current from the alternating current power source through the feeder section and the incoming section by applying an electric field in a direction crossing the direction of the movement of the mold.

The first device for manufacturing biodegradable molded objects is characterized by comprising (1) a mold made up of first and second conductive mold halves and an insulating section therebetween, in which materials having biodegradability are placed, (2) an alternating current power source for applying alternating current across both the mold halves, to heat and expand the materials by means of dielectric heating, (3) a conductive incoming section provided on the first mold half, and (4) a conductive feeder section provided in parallel with the incoming section, so as to be not in contact with the incoming section, wherein, while the mold containing the materials is moved in a predetermined direction, alternating current from the power source is applied across both the mold halves through the feeder section and the incoming section, by applying an electric field in a direction crossing the direction of the movement of the mold.

In the foregoing method and arrangement, the molds are not in direct contact with the electrodes. Therefore, mass production by serial operation is possible, and molded objects superior in moldability and physical properties can be produced.

The second method for manufacturing biodegradable molded objects is the first method, in which the feeder and incoming sections are arranged so that an area at which the feeder and incoming sections overlap each other varies as the mold is moved.

The second device for manufacturing biodegradable molded objects is the first device, in which the feeder and incoming sections have such shapes that an area at which the feeder and incoming sections overlap each other varies as the mold is moved.

With the foregoing method and arrangement, in addition to the effect of the first method and the first device, the following effect can be achieved. Namely, adjustment of output according to the stage of heating treatment can be easily conducted as intended, and molded objects superior in moldability and physical properties can be produced.

The third method for manufacturing biodegradable molded objects is the first method, in which the feeder and incoming sections are arranged so that a width of a space formed between the incoming and feeder sections when overlapping each other varies as the mold is moved.

Furthermore, the third device for manufacturing biodegradable molded objects is the first device, in which the feeder and incoming sections have such shapes that a width of a space formed between the incoming and feeder sections when overlapping each other varies as the mold is moved.

With the foregoing method and arrangement, in addition to the effect of the first method and the first device, the following effect can be achieved. Namely, adjustment of output according to the stage of heating treatment can be easily conducted as intended, and molded objects superior in moldability and physical properties can be produced.

The fourth method for manufacturing biodegradable molded objects is any one of the first through third methods, in which an insulating body is provided in a space formed between the incoming and feeder sections when overlapping each other as the mold is moved.

Furthermore, the fourth device for manufacturing biodegradable molded objects is any one of the first through third method, in which an insulating body is provided in a space formed between the incoming and feeder sections when overlapping each other as the mold is moved.

With the foregoing method and arrangement, in addition to the effect of the first through third methods and the first through third devices, the following effect can be achieved. Namely, more efficient heating and drying can be performed.

Besides, by appropriately varying the dielectric properties of the insulating body, adjustment of thermal expansion and driving is easily conducted. Moreover, when the incoming and feeder sections are moved, conductive parts of the incoming and feeder sections are not brought in direct contact with each other and are moved with an appropriate distance maintained therebetween, since the insulating body is present in the space. For this reason, in addition to the effect of the first through third methods and the first through third devices, the following effect can be achieved. Namely, sparking and the like is more effectively prevented, and molded objects superior in moldability and physical properties are produced in a more stable manner.

The fifth method for manufacturing biodegradable molded objects is any one of the first through fourth methods, in which external heating is applied in combination with the dielectric heating, to heat the materials.

With the foregoing method, in addition to the effect of any one of the first through fourth methods, the following effect can be achieved by applying the external heating in combination with the other heating methods. Namely, the molding time is further shortened. Further, heating can be performed even when it is difficult to heat using the other heating methods mentioned above because of complicated structures, such as a parallel cross structure, or a structure with dividers, which make it difficult to provide electrodes opposite one another, and to which, accordingly, it is difficult to apply a voltage. In such a case, it is sufficient to externally heat only those portions which are difficult to heat using the other heating methods mentioned above, and accordingly, the structure of the external heating device can be made simpler than when molding by external heating alone. Further, the temperature control conditions for external heating may be more relaxed than when molding by external heating alone. Thus it is possible to obtain a desired final molded object within a wide external heating temperature range such as "from 100° C. through 230° C." Consequently, the structure of the external heating device can be further simplified in comparison with molding by external heating alone.

The sixth method for manufacturing biodegradable molded objects is any one of the first through fifth methods, in which the materials have a composition with a weight ratio of 0 to 100 wheat, 10 to 200 starch, 0 to 10 salt, and 70 to 240 water, and water makes up 30% to 70% by weight of the whole.

It is more preferable if water makes up 40% to 60% by weight of the whole. Further, in the case of producing containers or cushioning materials, additional materials selected, as necessary, from among strength/flexibility imparting agents, colorants, mold release agents, foaming agents, water resistance imparting agents, etc., may be added with a weight ratio of 0 to 22 parts to the foregoing materials. In the case of producing molded baked snacks, additional materials selected, as necessary, from among sugar, flavorings, leavens, colorants, aromatics, oils, and emulsifiers etc., may be added with a weight ratio of 5 to 72 parts to the foregoing materials.

The seventh method for manufacturing biodegradable molded objects is any one of the first through sixth methods, in which the molded object has a thickness of 1 mm to 50 mm.

The foregoing method can be applied to a variety of shapes, and, with regard to not only the thin molded objects but thick ones as well, and molded objects superior in moldability and physical properties can be manufactured.

The eighth method for manufacturing biodegradable molded objects is any one of the first through seventh methods, in which a plurality of the molds are simultaneously heated.

The fifth device for manufacturing biodegradable molded objects is any one of the first through fourth methods, in which as the mold, a composite mold made up of a plurality of molds is used, the plurality of molds being fixed to each other so as to be heated simultaneously.

With the foregoing method and device, the mold halves are paired and power can be simultaneously supplied not only to the pair but also a plurality of other pairs of mold halves. Consequently, in addition to the effect of the first through seventh methods and the first through fourth devices, the following effect can be achieved. Namely, heating and drying in a stable and efficient manner is realized within a small space, and molded objects superior in moldability and physical properties are obtained.

The ninth method for manufacturing biodegradable molded objects is the eighth method, in which the number of the molds is different from the number of pairs of the incoming and feeder sections used for heating the molds.

Further, the sixth molding device for manufacturing biodegradable molded objects is the fifth device, in which the number of the molds in the composite mold is different from the number of pairs of the incoming and feeder sections used for heating the composite mold.

With the foregoing method and device, it is possible, not only that one pair of the incoming and feeder sections is provided with respect to one pair of mold halves, but also that with respect to a plurality of pairs of mold halves, a plurality of pairs of the incoming and feeder sections, which may be more or less than the pairs of mold halves, are provided. Further, the incoming and feeder sections may be provided at any positions on the set of the molds. With this, in addition to the effect of the eighth method and the fifth device, the following effect can be achieved. Namely, good operability, and efficient heating and drying, and molded objects superior in moldability and physical properties are obtained.

The tenth method for manufacturing biodegradable molded objects is any one of the first through ninth methods, in which a plurality of the molds are sequentially moved and subjected to dielectric heating, so that the molded objects are sequentially formed.

In the method, the plurality of the molds are sequentially moved and subjected to dielectric heating. Therefore, immediately after molded objects are removed from the molds when perfected, the materials for the next molding are placed in the vacant molds and the dielectric heating is started again. Thus, the molded objects can be produced continuously. With this, in addition to the effect of the first through ninth methods, the following effect can be achieved. Namely, mass production of the biodegradable molded objects is possible, and molded objects superior in moldability and physical properties are produced.

The eleventh method for manufacturing biodegradable molded objects is any one of the first through tenth methods, in which the alternating current has a frequency of 1 MHz to 100 MHz.

Further, the seventh device for manufacturing biodegradable molded objects is any one of the first through sixth devices, in which the alternating current has a frequency of 1 MHz to 100 MHz.

With the foregoing method and arrangement, in addition to the effect of the first through tenth methods and the first through sixth devices, the following effect can be achieved. Namely, molded objects superior in moldability and physical properties are produced.

The embodiments and concrete examples of implementation discussed in the foregoing detailed explanation of the present invention serve solely to illustrate the technical contents of the present invention, which should not be narrowly interpreted within the limits of such concrete examples, but rather may be applied in many variations without departing from the spirit of the present invention and the scope of the patent claims set forth below.

INDUSTRIAL APPLICABILITY

The present method and device for manufacturing biodegradable molded objects are capable of preventing arc discharge caused by contact of a mold with an electrode.

We claim:

1. A method for manufacturing biodegradable molded objects, comprising the steps of:
   placing materials having biodegradability in a mold having first and second conductive mold halves and an insulating section therebetween; and
   applying across both said mold halves alternating current from an alternating current power source, thus heating and expanding said materials by means of dielectric heating,
   wherein:
   said first mold half is provided with a conductive incoming section;
   a conductive feeder section is provided in parallel with said incoming section, so as to be not in contact with said incoming section; and
   in said alternating current applying step, said materials are heated and expanded by means of the dielectric heating, by moving said mold containing said materials in a predetermined direction, and by applying the alternating current from the alternating current power source through said feeder section and said incoming section by applying an electric field in a direction crossing the direction of the movement of said mold.

2. The method according to claim 1, wherein said feeder and incoming sections are arranged so that an area at which said feeder and incoming sections overlap each other varies as said mold is moved.

3. The method according to claim 1, wherein said feeder and incoming sections are arranged so that a width of a space formed between said incoming and feeder sections when overlapping each other varies as said mold is moved.

4. The method according to claim 3, wherein said feeder and incoming sections are arranged so that the space is once narrowed and thereafter widened as said mold is moved.

5. The method according to claim 3, wherein said feeder and incoming sections are arranged so that the space is widened as said mold is moved.

6. The method according to claim 3, wherein said feeder and incoming sections are arranged so that the space is narrowed as said mold is moved.

7. The method according to claim 1, wherein an insulating body is provided in a space formed between said incoming and feeder sections when overlapping each other as said mold is moved.

8. The method according to claim 1, wherein external heating is applied in combination with the dielectric heating, to heat said materials.

9. The method according to claim 1, wherein said materials have a composition with a weight ratio of 0 to 100 wheat, 10 to 200 starch, 0 to 10 salt, and 70 to 240 water, and water makes up 30% to 70% by weight of the whole.

10. The method according to claim 9, wherein in the composition of said materials, water makes up 40% to 60% by weight of the whole.

11. The method according to claim 1, wherein said molded object has a thickness of 1 mm to 50 mm.

12. The method according to claim 1, wherein a plurality of said molds are simultaneously heated.

13. The method according to claim 12, wherein the number of said molds simultaneously heated is different from the number of pairs of said incoming and feeder sections used for heating said molds.

14. The method according to claim 13, wherein the number of the pairs of said incoming and feeder sections is smaller than the number of said molds in a composite mold.

15. The method according to claim 13, wherein the number of the pairs of said incoming and feeder sections is greater than the number of said molds in a composite mold.

16. The method according to claim 1, wherein a plurality of said molds are sequentially moved and subjected to dielectric heating, so that the molded objects are sequentially formed.

17. The method according to claim 16, wherein a plurality of said molds are moved on a vertical plane.

18. The method according to claim 1, wherein the alternating current has a frequency of 1 MHz to 100 MHz.

19. The method according to claim 1, wherein heating of said materials is performed using as a grounded side one of said first and second mold halves which has more pointed areas than the other of said first and second mold halves.

20. A device for manufacturing biodegradable molded objects, comprising:
   a mold having first and second conductive mold halves and an insulating section therebetween, in which materials having biodegradability are placed;
   an alternating current power source for applying alternating current across both said mold halves, to heat and expand said materials by means of dielectric heating;
   a conductive incoming section provided on said first mold half; and
   a conductive feeder section provided in parallel with the incoming section, so as to be not in contact with the incoming section,
   wherein:
      while said mold containing the materials is moved in a predetermined direction, alternating current from said power source is applied across both said mold halves through said feeder section and said incoming section, by applying an electric field in a direction crossing the direction of the movement of said mold.

21. The device according to claim 20, wherein said feeder and incoming sections have such shapes that an area at which said feeder and incoming sections overlap each other varies as said mold is moved.

22. The device according to claim 21, wherein said feeder section has such a shape that an area of said feeder section overlapped by said incoming section varies as said mold is moved.

23. The device according to claim 21, wherein said incoming section has such a shape that an area of said incoming section overlapped by said feeder section varies as said mold is moved.

24. The device according to claim 20, wherein said feeder and incoming sections have such shapes that a width of a space formed between said incoming and feeder sections when overlapping each other varies as said mold is moved.

25. The device according to claim 24, wherein the space is once narrowed and thereafter widened as said mold is moved.

26. The device according to claim 24, wherein the space is widened as said mold is moved.

27. The device according to claim 24, wherein the space is narrowed as said mold is moved.

28. The device according to claim 20, wherein an insulating body is provided in a space formed between said incoming and feeder sections when overlapping each other as said mold is moved.

29. The device according to claim 28, wherein said insulating body has such a shape that a width thereof varies with position in the direction of the movement of said mold.

30. The device according to claim 20, wherein as said mold, a composite mold having a plurality of molds is used, said plurality of molds being fixed to each other so as to be heated simultaneously.

31. The device according to claim 30, wherein the number of said molds in said composite mold is different from the number of pairs of said incoming and feeder sections used for heating said composite mold.

32. The device according to claim 31, wherein the number of the pairs of said incoming and feeder sections is smaller than the number of said molds in the composite mold.

33. The device according to claim 31, wherein the number of the pairs of said incoming and feeder sections is greater than the number of said molds in the composite mold.

34. The device according to claim 20, wherein a path along which said molds are moved during the dielectric heating is in such a circulating form that a dielectric heating end position of said path comes in the vicinity of a dielectric heating commencement position of said path.

35. The device according to claim 34, wherein said path is formed on a vertical plane.

36. The device according to claim 20, wherein the alternating current has a frequency of 1 MHz to 100 MHz.

37. The device according to claim 20, wherein one of said first and second mold halves which has more pointed areas than the other of said first and second mold halves is used as a grounded side.

* * * * *